(12) United States Patent
Kawamura et al.

(10) Patent No.: US 11,667,107 B2
(45) Date of Patent: Jun. 6, 2023

(54) METAL-CARBON FIBER REINFORCED RESIN MATERIAL COMPOSITE

(71) Applicant: NIPPON STEEL CORPORATION, Tokyo (JP)

(72) Inventors: Yasuaki Kawamura, Tokyo (JP); Kohei Ueda, Tokyo (JP); Masumi Koori, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 86 days.

(21) Appl. No.: 17/599,985

(22) PCT Filed: Apr. 2, 2019

(86) PCT No.: PCT/JP2019/014597
§ 371 (c)(1),
(2) Date: Sep. 29, 2021

(87) PCT Pub. No.: WO2020/202457
PCT Pub. Date: Oct. 8, 2020

(65) Prior Publication Data
US 2022/0145026 A1    May 12, 2022

(51) Int. Cl.
*B32B 7/12* (2006.01)
*B32B 15/14* (2006.01)

(52) U.S. Cl.
CPC ............... *B32B 7/12* (2013.01); *B32B 15/14* (2013.01); *B32B 2255/06* (2013.01);
(Continued)

(58) Field of Classification Search
CPC ....... B32B 7/12; B32B 15/14; B32B 2255/06; B32B 2255/26; B32B 2260/021; B32B 2260/046; B32B 2262/106
(Continued)

(56) References Cited

U.S. PATENT DOCUMENTS 6,468,613 B1    10/2002   Kitano et al.
2015/0056439 A1    2/2015   Morikawa et al.
(Continued)

FOREIGN PATENT DOCUMENTS

EP     3 778 218 A1     2/2021
JP     2014-162848 A    9/2014
(Continued)

OTHER PUBLICATIONS

Plate-Like Composite Material. JP2010143009A (Year: 2010).*

*Primary Examiner* — Betelhem Shewareged
(74) *Attorney, Agent, or Firm* — Birch, Stewart, Kolasch & Birch, LLP

(57) ABSTRACT

This metal-carbon fiber reinforced resin material composite includes a metal member, a coating layer that is disposed on at least a part of a surface of the metal member and contains a resin, a carbon fiber reinforced resin material layer that is disposed on at least a part of a surface of the coating layer and contains a matrix resin and a carbon fiber material that is present in the matrix resin, and an electrodeposition film disposed so as to cover at least all of surfaces of the carbon fiber reinforced resin material layer, an interface between the metal member and the coating layer, and an interface between the coating layer and the carbon fiber reinforced resin material layer, in which an average film thickness A of the electrodeposition film formed on the surface of the carbon fiber reinforced resin material layer is 0.3 to 1.4 μm, and, at the time of immersing the metal-carbon fiber reinforced resin material composite in a 5 mass % sodium chloride aqueous solution with the electrodeposition film removed, an alternating impedance at a frequency of 1 Hz is $1 \times 10^7 \, \Omega$ to $1 \times 10^9 \, \Omega$.

6 Claims, 7 Drawing Sheets

(52) U.S. Cl.
CPC ..... *B32B 2255/26* (2013.01); *B32B 2260/021* (2013.01); *B32B 2260/046* (2013.01); *B32B 2262/106* (2013.01)

(58) Field of Classification Search
USPC ........................................................ 428/209
See application file for complete search history.

(56) References Cited

U.S. PATENT DOCUMENTS

| | | |
|---|---|---|
| 2015/0367605 A1 | 12/2015 | Morikawa et al. |
| 2017/0234342 A1 | 8/2017 | Ayuzawa et al. |
| 2018/0266463 A1 | 9/2018 | Mori et al. |
| 2022/0145026 A1* | 5/2022 | Kawamura ............. B32B 15/14 |

FOREIGN PATENT DOCUMENTS

| | | |
|---|---|---|
| WO | WO 99/10168 A1 | 3/1999 |
| WO | WO 2013/145712 A1 | 10/2013 |
| WO | WO 2014/111978 A1 | 7/2014 |
| WO | WO 2016/021259 A1 | 2/2016 |
| WO | WO 2016/117062 A1 | 7/2016 |

* cited by examiner

METAL-CARBON FIBER REINFORCED RESIN MATERIAL COMPOSITE

TECHNICAL FIELD

The present invention relates to a metal-carbon fiber reinforced resin material composite.

BACKGROUND ART

Fiber reinforced plastics (FRPs), which are a composite material containing a reinforced fiber (for example, a glass fiber, a carbon fiber, or the like) in a matrix resin, are lightweight and excellent in terms of tensile strength, processability, and the like. Therefore, FRPs are being widely used from commercial fields to industrial uses. Even in the automobile industry, in order to satisfy a need for the weight reduction of vehicle bodies, which leads to improvement in gas mileage and other performance, studies are underway to apply FRPs to automobile members with attention paid to the light weight, tensile strength, processability, and the like of FRPs.

In particular, carbon fiber reinforced plastics (CFRPs) in which a carbon fiber is used as a reinforcing fiber are particularly lightweight and also have an excellent tensile strength attributed to the strength of the carbon fiber and are thus a prominent material in a variety of uses including automobile members.

Meanwhile, the matrix resin of CFRPs is normally a thermosetting resin such as an epoxy resin and is thus brittle, which makes CFRPs susceptible to brittle fracture in the event of deformation. Furthermore, CFRPs are normally expensive and cause an increase in the costs of a variety of members such as automobile members.

In order to solve these problems while maintaining the above-described advantages of CFRPs, recently, metal member-CFRP composite materials in which a metal member and a CFRP are laminated and integrated (composited) together have been under study. Since metal members are ductile, compositing a CFRP with such a metal member makes it possible to overcome the brittleness, which is a disadvantage of CFRPs, and to deform and process composite materials. Furthermore, compositing an inexpensive metal member and a CFRP makes it possible to decrease the amount of the CFRP used and thus to reduce the costs of automobile members.

Incidentally, the carbon fiber in CFRPs is a favorable conductor. Therefore, there is a likelihood that the metal member in contact with a CFRP may become electrically conductive with the carbon fiber in the CFRP and thus a phenomenon in which the metal member is corroded due to an electrolytic corrosion action (dissimilar material contact corrosion) may occur. Several proposals have been made in order to prevent such dissimilar material contact corrosion.

Patent Document 1 proposes a carbon fiber reinforced resin compact in which a particulate or oil-form silicone compound is dispersed in a matrix resin of the carbon fiber reinforced resin compact and which is used in a state of being in contact with a metal component.

Patent Document 2 proposes a fiber reinforced resin member in which a non-conductive sheet such as a non-conductive sleeve and a glass fiber reinforced resin is disposed between a metal fastening member and a CFRP laminated sheet. Patent Document 3 proposes a fastening structure of a carbon fiber reinforced resin material in which the carbon fiber reinforced resin material and an abutting portion of a metal collar are attached to each other through an insulating adhesive.

Patent Document 4 proposes a light metal/CFRP structural member having an adhesive layer with a volume specific resistance of $1\times10^{13}$ Ω·cm or higher between a light metal material and a CFRP material. Patent Documents 5 and 6 propose the formation of a covering on a surface of a metal shaped material.

CITATION LIST

Patent Document

Patent Document 1

Japanese Unexamined Patent Application, First Publication No. 2014-162848

Patent Document 2

PCT International Publication No. WO 2016/021259

Patent Document 3

PCT International Publication No. WO 2016/117062

Patent Document 4

PCT International Publication No. WO 99/10168

Patent Document 5

PCT International Publication No. WO 2014/111978

Patent Document 6

PCT International Publication No. WO 2013/145712

SUMMARY OF THE INVENTION

Problems to be Solved by the Invention

However, the compact described in Patent Document 1 is a compact in which the surface of the carbon fiber reinforced resin compact is made water-repellent with silicone, but is not a compact in which the electric conduction between a carbon fiber and a metal component is prevented. Therefore, it is difficult to sufficiently suppress dissimilar material contact corrosion.

In addition, the techniques according to Patent Documents 2 and 3 are merely techniques regarding the joining between a metal member and a carbon reinforced resin material and cannot be directly applied to metal-carbon fiber reinforced resin material composites. For example, in the adhesion portion between a metal and a carbon fiber reinforced resin material in a metal-carbon fiber reinforced resin material composite, there is a need to attach the metal and the carbon fiber reinforced resin material to each other with a relatively thin resin layer in order to maintain the integrity of the composite. Therefore, in the composite, it is difficult to dispose such a relatively thick glass fiber reinforced resin as described in Patent Document 2.

In addition, it is not evident whether or not the disposition of such a relatively thin insulating resin layer as described in Patent Document 3 makes it possible to sufficiently suppress dissimilar material contact corrosion.

The light metal/CFRP structural member described in Patent Document 4 is a light metal/CFRP structural member provided with an adhesive layer having a volume specific resistance of 1×10$^{13}$ Ω·cm or higher and suppresses dissimilar metal contact corrosion at high temperatures and high humidities due to the high resistance value of the adhesive layer. However, there have been no studies regarding dissimilar metal contact corrosion under corrosive environments in which a corrosion factor such as saline water is present or the resistance values of the member under corrosive environments, and it is difficult to sufficiently suppress dissimilar metal contact corrosion.

In Patent Documents 5 and 6, a resin coating layer is provided on the surface of the metal member in order to enhance the adhesion and the sealing property between the metal shaped material and a thermoplastic resin composition, and the adhesion and the sealing property are attained by thermally fusing the metal shaped material with the thermoplastic resin composition. However, it is difficult to suppress dissimilar material contact corrosion in metal-carbon fiber reinforced resin material composites.

Additionally, in the metal carbon fiber reinforced resin material composites exemplified above, there is a likelihood that water, saline water, or the like, which acts as a cause for corrosion, may intrude from an end portion of the interface between the carbon fiber reinforced resin layer and the metal to cause corrosion.

Therefore, the present invention is an invention made in consideration of the above-described problems and an object of the present invention is to provide a new and improved metal-carbon fiber reinforced resin material composite in which corrosion of a metal member, particularly, dissimilar material contact corrosion, is suppressed.

Means for Solving the Problem

The present inventors carried out intensive studies to solve the above-described problems. As a result, it was found that dissimilar metal contact corrosion can be suppressed by increasing the alternating impedance of a metal-carbon fiber reinforced resin material composite in electrolytic solutions in which dissimilar metal contact corrosion may occur.

The present invention is an invention made based on the above-described finding and the gist thereof is as described below.

(1) A metal-carbon fiber reinforced resin material composite according to an aspect of the present invention includes a metal member, a coating layer that is disposed on at least a part of a surface of the metal member and contains a resin, a carbon fiber reinforced resin material layer that is disposed on at least a part of a surface of the coating layer and contains a matrix resin and a carbon fiber material that is present in the matrix resin, and an electrodeposition film disposed so as to cover at least all of surfaces of the carbon fiber reinforced resin material layer, an interface between the metal member and the coating layer, and an interface between the coating layer and the carbon fiber reinforced resin material layer, in which an average film thickness A of the electrodeposition film formed on the surface of the carbon fiber reinforced resin material layer is 0.3 to 1.4 μm, and after removing the electrodeposition film, immersing the metal-carbon fiber reinforced resin material composite in an aqueous solution containing 5 mass % of sodium chloride, an alternating impedance at a frequency of 1 Hz is 1×10$^7$Ω to 1×10$^9$Ω.

(2) The metal-carbon fiber reinforced resin material composite according to (1), in which, in a first region of the surface of the metal member in which the coating layer is not disposed, the average film thickness A and an average film thickness B of the electrodeposition film formed on the first region may satisfy the following formula (1).

$$B > 10 \times A \quad (1)$$

(3) The metal-carbon fiber reinforced resin material composite according to (1) or (2), in which, in a second region of the surface of the coating layer in which the carbon fiber reinforced resin material layer is not disposed, the average film thickness A and an average film thickness C of the electrodeposition film formed on the second region may satisfy the following formula (2).

$$5\ \mu m > C > A \quad (2)$$

(4) The metal-carbon fiber reinforced resin material composite according to any one of (1) to (3), in which the coating layer may be made up of a plurality of resin layers.

(5) The metal-carbon fiber reinforced resin material composite according to any one of (1) to (4), in which the matrix resin may contain 50 mass % or more of a phenoxy resin.

(6) The metal-carbon fiber reinforced resin material composite according to any one of (1) to (5), in which the coating layer may contain an epoxy resin.

Effects of the Invention

As described above, according to the present invention, it is possible to provide a new and improved metal-carbon fiber reinforced resin material composite in which corrosion of a metal member, particularly, dissimilar material contact corrosion, is suppressed.

EMBODIMENT FOR IMPLEMENTING THE INVENTION

Hereinafter, a preferable embodiment of the present invention will be described in detail with reference to the accompanying drawings. In the present specification and the drawings, configurational elements having substantially the same function and configuration will be given the same reference symbol and will not be described again.

Each drawing is appropriately enlarged or contracted in order to facilitate description, and the drawings are not intended to show the actual sizes and ratios of individual portions.

<Metal-Carbon Fiber Reinforced Resin Material Composite>

[Configuration of Metal-Carbon Fiber Reinforced Resin Material Composite]

Figure 1:
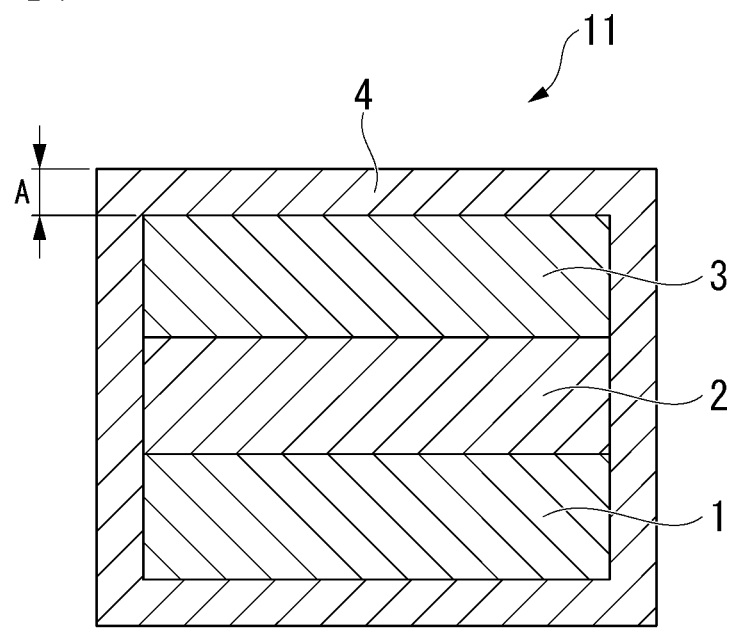
FIG. 1 is a cross-sectional schematic view of a metal-carbon fiber reinforced resin material composite according to an embodiment of the present invention in a lamination direction.
Figure 2:
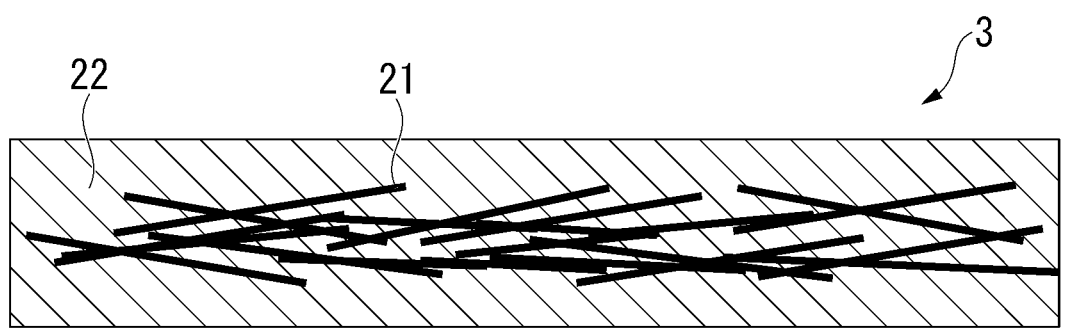
FIG. 2 is a cross-sectional schematic view of a carbon fiber material reinforced resin material layer that is used in the metal-carbon fiber reinforced resin material composite according to the embodiment of the present invention.

First, the configuration of a metal-carbon fiber reinforced resin material composite according to an embodiment of the present invention will be described with reference to FIG. 1. FIG. 1 is a schematic view showing a cross-sectional structure of a metal-carbon fiber reinforced resin material composite 11 in a lamination direction as an example of the metal-carbon fiber reinforced resin material composite according to the present embodiment. FIG. 2 is an example of the cross-sectional schematic view of a carbon fiber reinforced resin material layer 3.

As shown in FIG. 1, the metal-carbon fiber reinforced resin material composite 11 includes a metal member 1, a coating layer 2, the carbon fiber reinforced resin material layer (CFRP layer) 3, and an electrodeposition film 4. The metal member 1, the coating layer 2, the CFRP layer 3, and the electrodeposition film 4 are composited together. Here, "being composited together" means that the metal member 1, the coating layer 2, the CFRP layer 3, and the electrodeposition film 4 are attached (stuck) to each other and integrated together. In addition, "being integrated together" means that metal member 1, the coating layer 2, the CFRP layer 3, and the electrodeposition film 4 move as a unit at the time of being processed or deformed. As shown in FIG. 2, the CFRP layer 3 includes strands of a carbon fiber material 21 and a matrix resin 22. In FIG. 2, the carbon fiber material 21 is shown in a short fiber shape, but the carbon fiber material 21 may be a cloth material or the like obtained by extensively scutching a continuous fiber or a carbon fiber.

In addition, in the present embodiment, predetermined physical properties and predetermined thicknesses are imparted to the coating layer 2 and the matrix resin 22 in the CFRP layer 3, which makes it possible to set the alternating impedance of the metal-carbon fiber reinforced resin material composite 11 at a frequency of 1 Hz at the time of being immersed in a 5 mass % sodium chloride aqueous solution to $1 \times 10^7 \Omega$ to $1 \times 10^9 \Omega$ and to suppress dissimilar metal contact corrosion under corrosive environments.

Hereinafter, the alternating impedance will be described in detail.

Figure 8:
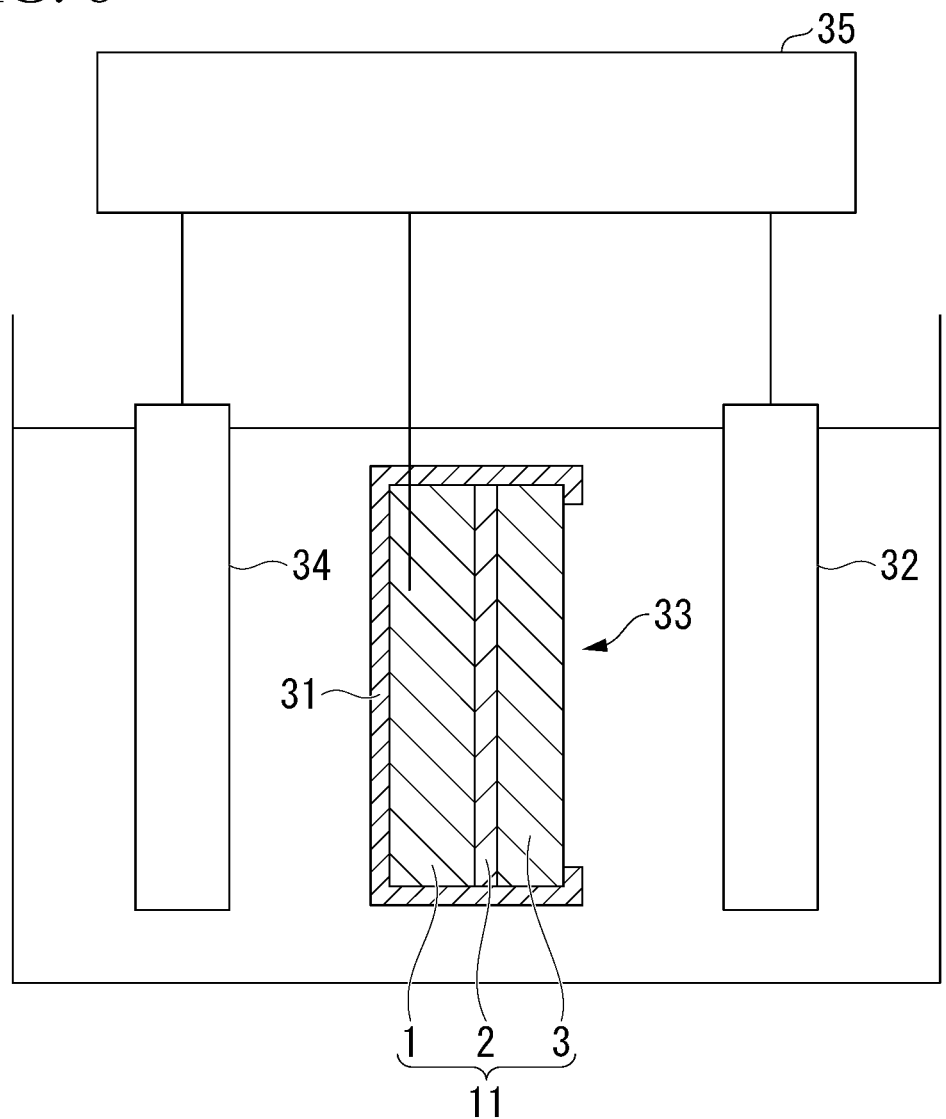
FIG. 8 is a measurement schematic view of alternating impedance measurement.

In the embodiment of the present application, the alternating impedance is measured by the following method. FIG. 8 is a schematic view of impedance measurement.

As an alternating impedance measurement sample, the metal-carbon fiber reinforced resin material composite 11 ($\phi$5 mm) from which the electrodeposition film 4 on the CFRP layer 3 has been detached is used.

A lead wire is attached to the metal member 1 such that the CFRP layer 3 side of the alternating impedance measurement sample becomes a surface (working electrode 33) that comes into contact with an electrolytic solution. At that time, the alternating impedance measurement sample is covered with a silicon rubber packing 31, and an adjustment is made such that the contact area (measurement area) between the CFRP layer 3 of the alternating impedance measurement sample and the electrolytic solution becomes 1.0 cm$^2$. A carbon electrode is used as a counter electrode 32, a silver-silver chloride electrode is used as a reference electrode 34, and a 5% sodium chloride aqueous solution (100 ml, 25° C.) having a saturated dissolved oxygen level is used as the electrolytic solution. The alternating impedance measurement sample is left to stand in the electrolytic solution for 60 minutes, a 5 mV alternating voltage is then injected thereinto using a potentiostat 35, the frequency is changed from 10 mHz to 1 kHz, and the alternating impedance is measured.

An example of the method for producing the alternating impedance measurement sample will be described below.

In a case where there is a plate or the electrodeposition film 4 on the metal member 1 in the side of the metal-carbon fiber reinforced resin material composite 11 to which the CFRP layer 3 is not stuck, an exposed portion of the metal member 1 for sticking the lead wire is formed.

Next, the electrodeposition film 4 on the CFRP layer 3 on the metal-carbon fiber reinforced resin material composite 11 is detached using a surface and interfacial cutting analysis system "SAICAS (registered trademark) EN" manufactured by Daipla Wintes Co., Ltd. After that, a $\phi$15 mm sample is obtained by blanking from the metal-carbon fiber reinforced resin material composite 11 from which the electrodeposition film has been detached, and burrs are removed from the blanked sample using a file, thereby producing a measurement sample.

As a result of intensive studies, the inventors found that, at the time of detaching the electrodeposition film 4 on the CFRP layer 3 with the surface and interfacial cutting analysis system, in a case where the surface of the CFRP layer 3 is scraped off as deep as 100 μm or less toward the CFRP layer 3 from the interface between the CFRP layer 3 and the electrodeposition film 4, the value of the alternating impedance does not significantly change. Therefore, in the detachment of the electrodeposition film 4, the surface of the CFRP layer 3 is scraped off as deep as 100 μm or less toward the CFRP layer 3 from the interface between the CFRP layer 3 and the electrodeposition film 4. As the surface and interfacial cutting analysis system, it is also possible to use a different commercially available device as long as the device has the same mechanism as "SAICAS (registered trademark) EN" manufactured by Daipla Wintes Co., Ltd.

The measurement of this alternating impedance makes it possible to measure the penetration resistances of the metal-carbon fiber reinforced resin material composite 11 under electrolytic solution environments and, consequently, to quantitatively predict the degrees of dissimilar metal contact corrosion under corrosive environments. In a case where the metal member 1 and the CFRP layer 3 are in contact with each other, since electric conduction between the metal member 1 and the CFRP layer 3 is secured, dissimilar metal contact corrosion occurs. In addition, even in a case where the metal member 1 and the CFRP layer 3 are not in contact with each other, water, saline water, or the like, which acts as a corrosion factor, intrudes into the CFRP layer 3 and, furthermore, the water or saline water reaches the surface of the metal member 1, which creates a concern of the occurrence of dissimilar metal contact corrosion between the metal and the carbon fiber reinforced resin material through the water, the saline water, or the like. Therefore, in order to obtain high anticorrosion performance, there is a need to increase the penetration resistance (alternating impedance) of the metal-carbon fiber reinforced resin material (CFRP) composite 11 in the presence of water, saline water, or the like (in an electrolytic solution). The alternating impedance of the metal-carbon fiber reinforced resin material composite 11 at a frequency of 1 Hz at the time of being immersed in a 5 mass % sodium chloride aqueous solution is $1 \times 10^7 \Omega$ to $1 \times 10^9 \Omega$. Hereinafter, unless particularly commented, in each case, the alternating impedance refers to an alternating impedance at a frequency of 1 Hz at the time of being immersed in a 5 mass % sodium chloride aqueous solution. When the alternating impedance of the metal-carbon fiber reinforced resin material composite 11 is lower than $1 \times 10^7 \Omega$, it is not possible to suppress dissimilar metal contact corrosion, which is not preferable. With alternating impedances of higher than $1 \times 10^9 \Omega$, since the electrodeposition film is not sufficiently attached onto the CFRP layer 3, it is not possible to suppress the intrusion of the corrosion factor such as water or saline water, which is not preferable.

Hereinafter, each configuration of the metal-carbon fiber reinforced resin material composite 11 will be described in detail.

(Metal Member 1)

The material, shape, thickness, and the like of the metal member 1 are not particularly limited; however, regarding the shape, a sheet-like metal member 1 or a metal member 1 obtained by processing a sheet-like material is preferred. Examples of the material of the metal member 1 include iron, titanium, aluminum, magnesium, alloys thereof, and the like. Here, examples of the alloys include iron-based alloys (including stainless steel), Ti-based alloys, Al-based alloys, Mg alloys, and the like. The material of the metal member 1 is preferably an iron and steel material (steel), an iron-based alloy, titanium, or aluminum and more preferably an iron and steel material having a higher tensile strength than other metal types. As such an iron and steel material, there are, for example, iron and steel materials standardized by Japanese Industrial Standards (HS) or the like, and examples thereof include carbon steel, alloy steel, high-tensile steel, and the like that are used for ordinary structures or mechanical structures. Specific examples of such an iron and steel material include cold-rolled steel, hot-rolled steel, hot-rolled steel sheet materials for automobile structures, hot-rolled high-tensile steel sheet materials for automobile processing, cold-rolled steel sheet materials for automobile structures, cold-rolled high-tensile steel sheet materials for automobile processing, high-tensile steel that is quenched during hot processing and is ordinarily referred to as hot stamp materials, and the like. In the case of the steel, the components are not particularly limited, and it is possible to add, in addition to Fe and C, one or more of Si, Mn, P, Al, N, Cr, Mo, Ni, Cu, Ca, Mg, Ce, Hf, La, Zr, and Sb. As these additive elements, one or more elements are appropriately selected in order to obtain a required material strength and required formability, and the amount of the element added can also be appropriately adjusted. In a case where the metal member 1 has a sheet shape, the metal member 1 may be formed.

On the iron and steel material that is used for the metal member 1, an arbitrary surface treatment may be carried out. Here, the surface treatment refers to, for example, a variety of plating treatments such as zinc-based plating, aluminum-based plating, and tin-based plating. A plated steel on which a plating treatment has been carried out is preferable as the metal member 1 from the viewpoint of the excellent corrosion resistance. Examples of plated steel sheets that are particularly preferable as the metal member 1 include hot-dip galvanized steel sheets, zinc alloy plated steel sheets or alloyed hot-dip galvanized steel sheets obtained by heating a zinc alloy plated steel sheet to diffuse Fe in a zinc plate and thereby alloy the zinc plate, electrogalvanized steel sheets, electrodeposited Zn—Ni steel sheets, hot-dip Zn—Al alloy plated steel sheets represented by hot-dip Zn-5% Al alloy plated steel sheets or hot-dip 55% Al—Zn alloy plated steel sheets, hot-dip Zn—Al—Mg alloy plated steel sheets represented by hot-dip Zn-1% to 12% Al-1% to 4% Mg alloy plated steel sheets or hot-dip 55% Al—Zn-0.1% to 3% Mg alloy plated steel sheets, Ni plated steel sheets or alloyed Ni plated steel sheets obtained by heating a Ni plated steel sheet to diffuse Fe in a Ni plate and thereby alloy the Ni plate, Al plated steel sheets, tin plated steel sheets, chromium plated steel sheets, and the like. Zinc-based plated steel sheets are preferable due to the particularly excellent corrosion resistance. Furthermore, Zn—Al—Mg alloy plated steel sheets are more preferable due to the superior corrosion resistance.

In addition, the metal member 1 is preferably an aluminum alloy since it is possible to reduce the weight of the member. As the aluminum alloy, it is possible to use an aluminum alloy obtained by adding one or more selected from the group consisting of Si, Fe, Cu, Mn, Mg, Cr, Zn, Ti, V, Zr, Pb, and Bi to Al. As the metal member 1, it is possible to use ordinarily well-known aluminum alloys, for example, 1000-series aluminum alloys, 2000-series aluminum alloys, 3000-series aluminum alloys, 4000-series aluminum alloys, 5000-series aluminum alloys, 6000-series aluminum alloys, and 7000-series aluminum alloys described in JIS H 4000: 2006. 5000-series aluminum alloys, 6000-series aluminum alloys, and the like having strength and formability are preferable as the aluminum alloy. As a magnesium alloy, it is possible to use a magnesium alloy obtained by adding one or more selected from the group consisting of Al, Zn, Mn, Fe, Si, Cu, Ni, Ca, Zr, Li, Pb, Ag, Cr, Sn, Y, Sb, and other rare earth elements to magnesium. As the metal member 1, it is possible to use ordinarily well-known magnesium alloys, for example, AM-series magnesium alloys that are magnesium alloys to which Al is added, AZ-series magnesium alloys that are aluminum alloys to which Al and Zn are added, ZK-series magnesium alloys that are magnesium alloys to which Zn is added, and the like, which are described in ASTM standards.

In the formation of the coating layer 2, ordinarily, it is preferable to carry out a well-known surface treatment for painting as necessary on the metal member 1. This surface treatment for painting is preferably carried out as described below. First, in order to clean the surface of a steel sheet that is served as the metal member 1, alkali degreasing or the like is carried out on the steel sheet. After that, a surface conditioning treatment is carried out on the metal member 1 with an acidic or alkaline aqueous solution containing an ion of an iron-group metal such as Ni. A chemical conversion treatment is carried out on the surface-conditioned steel sheet. The chemical conversion treatment of the steel sheet may be an ordinarily well-known chromate treatment, but it is preferable to use a chemical conversion treatment liquid substantially containing no chromium in the chemical conversion treatment since the amount of a substance of concern is reduced. A typical example of such a chemical conversion treatment liquid is a silica-based chemical conversion treatment liquid containing a silicon compound such as liquid-form silica, gas-form silica and/or a silicate as a main coating component together with a resin in some cases. In addition, a zirconium-based chemical conversion treatment containing zirconate as a main component may also be used.

The chemical conversion treatment of the steel sheet is not limited to a silica-based chemical conversion treatment. In recent years, a variety of chromium-free chemical conversion treatment liquids other than silica-based chemical conversion treatment liquids have been proposed for uses in the surface treatment for painting. As the amount of a chemical conversion treatment coating attached that is formed by the chemical conversion treatment, an appropriate amount attached may be selected depending on a chemical conversion treatment to be used. In the case of the silica-based chemical conversion treatment liquid, an ordinary amount attached is preferably within 1 to 20 mg/m$^2$ in terms of Si. The above-described surface treatment for painting improves the adhesion between the metal member 1 and the coating layer 2.

(Carbon Fiber Reinforced Resin Material Layer (CFRP Layer) 3)

As shown in FIG. 2, the CFRP layer 3 has the matrix resin 22 and strands of the carbon fiber material 21 contained in the matrix resin 22.

The carbon fiber material 21 is not particularly limited, and, for example, both a PAN-based carbon fiber material 21 and a pitch-based carbon fiber material 21 can be used and may be selected depending on the purpose or use. In addition, as the carbon fiber material 21, the PAN-based carbon fiber material 21 or the pitch-based carbon fiber material 21 may be used singly or a plurality of kinds thereof may be jointly used.

Examples of the form of the carbon fiber material 21 that is used in the CFRP layer 3 include a non-woven fabric base material in which chopped fibers are used, a cloth material in which a continuous fiber is used, a unidirectional reinforced fiber base material (UD material), and the like. From the viewpoint of a reinforcing effect, a cloth material or a UD material is preferably used as the reinforced fiber base material.

As the matrix resin 22, it is possible to use a solidified substance or cured substance of a resin composition (or crosslinking resin composition). Here, "solidified substance" refers to a resin composition in which a resin component itself is solidified, and "cured substance" refers to a resin composition in which a resin component is cured by adding a variety of curing agents to the resin component. Examples of the curing agent that can be contained in the cured substance include crosslinking agents described below, and the "cured substance" is defined as a resin containing a cross-linked cured substance formed by crosslinking.

As the resin composition that configures the matrix resin 22, any of a thermosetting resin and a thermoplastic resin can be used, but a thermoplastic resin is preferably contained as a main component. The kind of the thermoplastic resin that can be used in the matrix resin 22 is not particularly limited, and it is possible to use one or more kinds selected from a phenoxy resin, a polyolefin, an acid-modified polyolefin, polystyrene, polymethyl methacrylate, an AS resin, an ABS resin, a thermoplastic aromatic polyester such as polyethylene terephthalate or polybutylene terephthalate, polycarbonate, a polyimide, a polyamide, a polyamide-imide, polyetherimide, polyethersulfone, a polyphenylene ether, a modified polyphenylene ether, a polyphenylene sulfide, polyoxymethylene, polyallylate, polyetherketone, polyetheretherketone, polyetherketoneketone, nylon, and the like. "Thermoplastic resin" also includes resins that can become a partially curable resin described below. Among them, a phenoxy resin is preferably used from the viewpoint of increasing the value of the alternating impedance of the metal-carbon fiber reinforced resin material composite 11. An example of the resin composition in the CFRP layer 3 in the present embodiment is a configuration containing 50 mass % of a phenoxy resin.

In addition, as the thermosetting resin that can be used in the matrix resin 22, it is possible to use, for example, one or more selected from an epoxy resin, a vinyl ester resin, a phenol resin, and a urethane resin.

The "phenoxy resin" is a linear polymer that is obtained from a condensation reaction between a divalent phenol compound and epihalohydrin or a polyaddition reaction between a divalent phenol compound and a bifunctional epoxy resin and is an amorphous thermoplastic resin. The phenoxy resin is very similar to an epoxy resin in molecular structure and thus has approximately the same degree of heat resistance as an epoxy resin. In addition, the phenoxy resin has favorable adhesiveness to the coating layer to be formed on the metal member 1 or the carbon fiber material 21. Furthermore, the phenoxy resin can be made into a so-called partially curable resin by adding a curing component such as an epoxy resin to the phenoxy resin and copolymerizing both. The use of such a partially curable resin as the matrix resin 22 makes it possible to produce a matrix resin having an excellent impregnation property with respect to the carbon fiber material 21. Therefore, it is possible to increase the alternating impedance of the CFRP layer 3, and it becomes possible to improve the alternating impedance of the metal-carbon fiber reinforced resin material composite 11.

Furthermore, the thermal curing of the curing component in the partially curable resin makes it possible to suppress the matrix resin 22 in the CFRP layer 3 being fused or softened when exposed to high temperatures like ordinary thermoplastic resins. The amount of the curing component added to the phenoxy resin may be appropriately determined in consideration of the impregnation property with respect to the carbon fiber material 21, the brittleness of the CFRP layer 3, the processing time and processability of the CFRP 3 layer, and the like. As described above, the use of the phenoxy resin as the matrix resin 22 makes it possible to add and control a curing component having a high degree of freedom in designing the resin composition.

In addition, it is usual to apply a sizing agent to the surfaces of the strands of the carbon fiber material 21 in order to improve the bundling property or resin adhesion of the strands of the carbon resin material 21, and a sizing agent having a favorable affinity to epoxy resins is often applied. Since the phenoxy resin is very similar to an epoxy resin in structure, the use of the phenoxy resin as the matrix resin 22 makes it possible to use sizing agents for epoxy resins as they are. Therefore, the use of the phenoxy resin makes it possible to enhance the cost competitiveness of the metal-carbon fiber reinforced resin material composite 11.

The amount of the phenoxy resin in the matrix resin 22 is preferably 50 mass % or more with respect to the total resin mass of the resin composition in the CFRP layer 3. With an amount of the phenoxy resin of 50 mass % or more, it is possible to further increase the alternating impedance of the metal-carbon fiber reinforced resin material composite 11. The upper limit of the amount of the phenoxy resin is not particularly limited and may be 100%.

The amount of the phenoxy resin in the matrix resin 22 can be measured by, for example, infrared spectroscopy (IR), and, in the case of analyzing the amount proportion of the phenoxy resin from the resin composition, which is the object of IR, the amount can be measured using an ordinary method of IR such as a transmission method or an ART reflection method.

In the case of analyzing the amount of the phenoxy resin in the matrix resin 22 by IR, since the absorption peak of the phenoxy resin is present at, for example, 1450 to 1480 cm$^{-1}$, near 1500 cm$^{-1}$, near 1600 cm$^{-1}$, or the like, it is possible to calculate the amount based on the intensity of the same absorption peak.

The phenoxy resin can be used in any form of a powder, a varnish, and a film. The average molecular weight of the phenoxy resin is, for example, within a range of 10,000 or more and 200,000 or less, preferably within a range of 20,000 or more and 100,000 or less, and more preferably within a range of 30,000 or more and 80,000 or less in terms of the mass-average molecular weight (Mw). When the Mw of the phenoxy resin (A) is set within a range of 10,000 or more, the strength of a compact can be increased, and this effect is further enhanced by setting the Mw to 20,000 or more and even further enhanced by setting the Mw to 30,000 or more. On the other hand, when the Mw of the phenoxy resin is set to 200,000 or less, the phenoxy resin is excellent in terms of workability or processability during processing. This effect is further enhanced by setting the Mw to 100,000 or less and even further enhanced by setting the Mw to 80,000 or less. As the Mw in the present specification, a value that is measured by gel permeation chromatography (GPC) and converted using a standard polystyrene calibration curve is used.

The hydroxyl equivalent (g/eq) of the phenoxy resin that is used in the present embodiment is, for example, within a range of 50 or more and 1000 or less, preferably within a range of 50 or more and 750 or less, and more preferably within a range of 50 or more and 500 or less. When the hydroxyl equivalent of the phenoxy resin is set to 50 or more, since the water absorption rate of the phenoxy resin decreases, it is possible to improve the mechanical properties of the cured substance. On the other hand, when the hydroxyl equivalent of the phenoxy resin is set to 1,000 or less, it is possible to improve the mechanical properties of the metal-carbon fiber reinforced resin material composite 11 by improving the affinity between the matrix resin 22 and the coating layer 2 or the carbon fiber material 21. This mechanical property improvement effect is further enhanced by setting the hydroxyl equivalent to 750 or less and even further enhanced by setting the hydroxyl equivalent to 500 or less.

In addition, the glass transition temperature (Tg) of the phenoxy resin is, for example, appropriately a phenoxy resin within a range of 65° C. or higher and 150° C. or lower and preferably within a range of 70° C. or higher and 150° C. or lower. When the Tg of the phenoxy resin is 65° C. or higher, since it is possible to suppress an increase in the fluidity of the resin while securing formability, it is possible to sufficiently secure the thickness of the coating layer 2. On the other hand, when the Tg of the phenoxy resin is 150° C. or lower, since the melt viscosity of the phenoxy resin becomes low, it becomes easy to impregnate the carbon fiber material 21 with the phenoxy resin without generating any defect such as a void, and it is possible to join the coating layer 2 and the CFRP layer 3 at lower temperatures. The Tg of the resin in the present specification is a numerical value that is measured at a temperature within a range of 20° C. to 280° C. under a temperature rising condition of 10° C./minute using a differential scanning calorimeter and calculated from a peak value of the second scanning.

The phenoxy resin is not particularly limited as long as the phenoxy resin satisfies the above-described physical properties, and examples of a preferable phenoxy resin include bisphenol A-type phenoxy resins (for example, PHENOTOTO YP-50, PHENOTOTO YP-50S, and PHENOTOTO YP-55U manufactured by Nippon Steel & Sumikin Chemical Co., Ltd. can be procured), bisphenol F-type phenoxy resins (for example, PHENOTOTO FX-316 manufactured by Nippon Steel & Sumikin Chemical Co., Ltd. can be procured), copolymerization-type phenoxy resins of bisphenol A and bisphenol F (for example, YP-70 manufactured by Nippon Steel & Sumikin Chemical Co., Ltd. can be procured), special phenoxy resins other than the phenoxy resins exemplified above such as brominated phenoxy resins, phosphorus-containing phenoxy resins, and sulfone group-containing phenoxy resins (for example, PHENOTOTO YPB-43C, PHENOTOTO FX293, YPS-007, and the like manufactured by Nippon Steel & Sumikin Chemical Co., Ltd. can be procured), and the like. These resins can be used singly or two or more resins can be used in a mixture form.

The thermoplastic resin that is used as the resin component in the matrix resin 22 is preferably a thermoplastic resin having a melt viscosity of 3,000 Pa·s or less at a temperature within a range of 160° C. to 250° C., more preferably a thermoplastic resin having a melt viscosity within a range of 90 Pa·s or more and 2,900 Pa·s or less, and still more preferably a thermoplastic resin having a melt viscosity within a range of 100 Pa·s or more and 2,800 Pa·s or less. When the melt viscosity at a temperature within a range of 160° C. to 250° C. is set to 3,000 Pa·s or less, the fluidity during the fusion of the matrix resin 22 becomes favorable, and a defect such as a void is unlikely to be generated in the CFRP layer 3. On the other hand, in a case where the melt viscosity is set to 90 Pa·s or less, the molecular weight of the thermoplastic resin as the resin composition is too small, and the CFRP layer 3 embrittles, which results in a decrease in the mechanical strength of the metal-carbon fiber reinforced resin material composite 11.

A crosslinking resin composition (that is, a cured substance of the resin composition) can also be formed by blending, for example, an acid anhydride, isocyanate, caprolactam, or the like as a crosslinking agent into the resin composition containing the phenoxy resin (hereinafter, also referred to as "phenoxy resin (A)"). Since a crosslinking reaction of the crosslinking resin composition using a secondary hydroxyl group that is contained in the phenoxy resin (A) improves the heat resistance of the resin composition, the crosslinking resin composition is advantageously applied to members that are used under environments with higher temperatures. In the formation of a crosslink using the secondary hydroxyl group of the phenoxy resin (A), a crosslinking resin composition into which a crosslinking curable resin (B) and a crosslinking agent (C) are blended is preferably used. As the crosslinking curable resin (B), for example, an epoxy resin or the like can be used, and there is no particular limitation.

Into the resin composition (containing the crosslinking resin composition) for forming the matrix resin 22, other additives, for example, natural rubber, synthetic rubber, an elastomer, or the like, a variety of inorganic fillers, a solvent, an extender pigment, a colorant, an antioxidant, an ultraviolet inhibitor, a flame retardant, or a flame-retarding agent may be blended as long as the adhesiveness or physical properties of the resin composition are not impaired.

In the metal-carbon fiber reinforced resin material composite 11, the matrix resin 22 in the CFRP layer 3 and a resin that configures the coating layer 2 (hereinafter, referred to as the coating resin) may be the same resin or different resins. However, from the viewpoint of sufficiently securing the adhesiveness between the CFRP layer 3 and the coating layer 2, the matrix resin 22 is preferably the same resin or the same kind of resin as the coating resin. In addition, as the matrix resin 22, a kind of resin that is similar to the coating resin in terms of the fraction or the like of a polar group that is contained in the coating resin is preferably selected. Examples of the kind of resin that is similar to the coating resin in terms of the fraction or the like of a polar group that is contained in the coating resin include resins having a similar number of carboxyl groups to the number of carboxyl groups in the coating resin. Here, "the same resin" means that the resin consists of the same components in the same composition fractions as the coating resin, and "the same kind of resin" means that the resin consists of the same components as the coating resin, but may be different in the composition fractions. "The same kind of resin" includes "the same resin". In addition, "the main component of the resin" refers to a component that accounts for 50 mass % or more in the total resin components of 100 mass %. The "resin components" include the thermoplastic resin or the thermosetting resin, but do not include a non-resin component such as the crosslinking agent.

In the metal-carbon fiber reinforced resin material composite 11, the CFRP layer 3 is formed using at least one pre-preg for forming the CFRP. The pre-preg refers to a material obtained by impregnating a carbon fiber with a resin and forming the carbon fiber into a sheet shape. The number of the pre-pregs for forming the CFRP to be laminated can be selected depending on a desired thickness of the CFRP layer 3. At the time of laminating the pre-pregs for forming the CFRP, a pre-preg having a low carbon fiber packing density or a layer including no carbon fiber is disposed on the surface of the CFRP layer 3 that comes into contact with the coating layer 2, whereby it is possible to increase the alternating impedance of the metal-carbon fiber reinforced resin material composite 11 and to improve the adhesion between the CFRP layer 3 and the coating layer 2.

In terms of increasing the alternating impedance of the CFRP layer 3 as a single body in an electrolytic solution in which dissimilar metal contact corrosion may occur, an epoxy resin and a phenoxy resin are preferably used as the matrix resin 22. This is because these resins have an excellent impregnation property with respect to the carbon fiber material 21, and thus the adhesion between the matrix resin 22 and the carbon fiber material 21 becomes favorable, and, as a result, it is possible to suppress the intrusion of the electrolytic solution along the interface between the matrix resin 22 and the carbon fiber material 21 as a path.

Furthermore, when a pigment having hydrophobicity (hydrophobic pigment) is contained in the matrix resin 22, it becomes possible to further increase the alternating impedance of the CFRP layer 3 as a single body in the electrolytic solution in which dissimilar metal contact corrosion may occur. Examples of the hydrophobic pigment include hydrophobic silica, hydrophobic alumina, hydrophobic titania, and the like. Among these, when the fact that the matrix resin 22 is hydrophobic is taken into account, hydrophobic silica is preferable from the viewpoint of the affinity. The amount of the hydrophobic pigment in the matrix resin 22 is preferably set to 2 mass % or more and 10 mass % or less in the matrix resin 22. This is because, when the amount of the hydrophobic resin in the matrix resin 22 is less than 2 mass %, there is a likelihood that a sufficient hydrophobic effect cannot be obtained, and, when the amount exceeds 10 mass %, the adhesion between the matrix resin 22 and the carbon fiber material 21 is impaired and the strength of the CFRP layer 3 decreases.

Here, the hydrophobic pigment may be a pigment intrinsically having hydrophobicity or a pigment imparted with hydrophobicity by a surface treatment.

In the CFRP layer 3, the strands of the carbon fiber material 21 are closely packed in the central portion, and the density of the strands of the carbon fiber material 21 is decreased in the surfaces and in the interfaces, whereby it becomes possible to further increase the alternating impedance in the electrolytic solution. In a case where the densities of the strands of the carbon fiber material 21 are low in the outer layers of the CFRP layer 3, the hydrophobic resin may be contained in the matrix resin present in the outer layers. Furthermore, in a laminate of the CFRP layers 3 formed by laminating the plurality of CFRP layers 3, the alternating impedance in the electrolytic solution becomes high compared with a single CFRP layer 3 having the same thickness. The reason therefor is considered as described below. The CFRP layer 3 in which the densities of the strands of the carbon fiber material 21 in the outer layers are low has a configuration in which the surface layers of the CFRP layer 3 are covered with the matrix resin 22. Therefore, when such CFRP layers 3 are laminated together, the CFRP layers 3 come into contact with each other through the surface layers made of the matrix resin 22. Therefore, the laminate of the CFRP layers 3 made up of the plurality of CFRP layers 3 have interfaces made up of a plurality of films of the matrix resin 22 between the surface of the CFRP layer 3 on the metal member 1 side and the surface of the CFRP layer 3 on the electrodeposition film 4 side. Therefore, the strands of the carbon fiber material 21 coming into contact and becoming electrically conductive with each other from the surface of the CFRP layer 3 on the metal member 1 side through the surface of the CFRP layer 3 on the electrodeposition film 4 side is prevented.

(Coating Layer 2)

The coating layer 2 is disposed between the metal member 1 and the CFRP layer 3 of the metal-carbon fiber reinforced resin material composite 11 and joins both. Therefore, in the metal-carbon fiber reinforced resin material composite 11, there are interfaces between the metal member 1 and the coating layer 2 and between the CFRP layer 3 and the coating layer 2, respectively. As the resin that is contained in the coating layer 2 (coating resin), any of a thermosetting resin and a thermoplastic resin can be used, but a thermosetting resin is particularly preferably used. As the thermosetting resin, it is possible to use, for example, one or more selected from a polyester resin, a urethane resin, an epoxy resin, a melamine resin, and the like. Since the alternating impedance of the metal-carbon fiber reinforced resin material composite 11 is set to $1 \times 10^7 \Omega$ or higher, an epoxy resin is particularly preferably used as the coating resin. As an example of the coating resin in the coating layer 2 in the present embodiment, an epoxy resin is an exemplary example. The coating layer 2 may contain a pigment such as a hydrophobic pigment. The amount of the pigment in the coating layer 2 is preferably less than 5 vol % with respect to all components in the coating layer.

In addition, the glass transition temperature Tg of the coating resin is preferably, for example, 20° C. or higher and 80° C. or lower. When the Tg is lower than 20° C., there is a likelihood that the alternating impedance of the metal-carbon fiber reinforced resin material composite 11 in the electrolytic solution may decrease, and, when the Tg is higher than 80° C., there is a likelihood that the coating layer 2 may crack after being processed and the alternating impedance of the metal-carbon fiber reinforced resin material composite 11 may decrease. A more preferable range of the glass transition temperature Tg of the coating resin is 35° C. or higher and 70° C. or lower.

The average thickness T of the coating layer 2 is not particularly limited, but is, for example, preferably 10 μm or more and 500 μm or less and more preferably 20 μm or more and 300 μm or less. When the average thickness T of the coating layer 2 is less than 10 μm, it is not possible for the coating layer 2 to have a sufficient barrier property, and there is a likelihood that the alternating impedance may decrease in the electrolytic solution. When the average thickness T exceeds 500 μm, the thickness is not preferable from the viewpoint of the cost, and there is a likelihood that the adhesion of the coating layer 2 may deteriorate due to an increase in the internal stress of the coating layer 2 attributed to an increase in the film thickness.

(Electrodeposition Film 4)

The electrodeposition film 4 is disposed to cover at least all of the surfaces of the CFRP layer 3, the interface between the metal member 1 and the coating layer 2, and the interface between the coating layer 2 and the CFRP layer 3 as shown in FIG. 1. Here, the expression "the electrodeposition film 4 covers the interfaces" means that, as shown in FIG. 1, the electrodeposition film 4 covers interfacial end portions, that is, at least the outer edges of the boundaries between the individual layers on the side surfaces of the laminate made up of the metal member 1, the coating layer 2, and the CFRP layer 3.

An electrodeposition paint that is used for the electrodeposition film 4 is not particularly limited as long as the electrodeposition paint is one that is ordinarily used for industrial uses, construction uses, and automotive uses. In the case of being used for automotive uses, the electrodeposition paint is more preferably an electrodeposition paint for automotive uses. As the material of the electrodeposition paint, it is possible to use, for example, a cationic epoxy resin, a cationic acrylic resin, an anionic acrylic resin, or the like. As the electrodeposition paint, a cationic epoxy resin is preferably used. The electrodeposition film 4 is formed by carrying out degreasing, surface adjustment, and a chemical conversion treatment on all of the surfaces of the metal member 1, the coating layer 2, and the CFRP layer 3 and then carrying out electrodeposition coating and baking.

There is a case where a place with a low alternating impedance is locally present on the surface of the CRFP layer 3. The reason for the formation of the place with a low alternating impedance is considered that water or saline water that has intruded into pores present in the coating layer 2 or the CFRP layer 3 comes into contact with the metal member 1 or the carbon fiber material 21 in the CFRP layer 3. The electrodeposition coating is carried out by applying a direct current voltage between an electrode and an application object, carrying out electrophoresis on the particles of the electrodeposition paint, and precipitating the particles of the electrodeposition paint on the surfaces of the application object. In the case of forming the electrodeposition film 4 on the CFRP layer 3, the particles of the electrodeposition paint move toward a place in which an electric current flows as described above. Therefore, the particles of the electrodeposition paint are selectively precipitated in the place with a low electric resistance that is present on the CFRP layer 3. Therefore, the formation of the electrodeposition film 4 makes it possible to efficiently block pores, which are likely to act as starting points of the intrusion of water or saline water, in the surface of the CFRP layer 3. In addition, when the electrodeposition film 4 is formed, since the interface between the metal member 1 and the coating layer 2 or the interface between the coating layer 2 and the CFRP layer 3 is covered with the electrodeposition film 4, it is possible to prevent the intrusion of the corrosion factor such as water or saline water from each interface. In FIG. 1, the electrodeposition film 4 is also formed on the surface of the metal member 1 opposite to the surface on which the coating layer 2 and the CFRP layer 3 are laminated. From the viewpoint of the corrosion resistance, it is preferable to form the electrodeposition film even on the surface of the metal member 1 opposite to the surface on which the coating layer 2 and the CFRP layer 3 are laminated and to cover all of the surfaces. In uses where water or like does not intrude into the surface of the metal member 1 opposite to the surface on which the coating layer 2 and the CFRP layer 3 are laminated, the electrodeposition film 4 may not be formed on the opposite surface.

The average film thickness A of the electrodeposition film 4 formed on the CFRP layer 3 is 0.3 to 1.4 μm. With the average film thickness A of less than 0.3 μm, it is not possible to prevent the intrusion of water or saline water, and the corrosion resistance of the metal-carbon fiber reinforced resin material composite 11 does not improve, which is not preferable. With the average film thickness A of more than 1.4 μm, not only is the corrosion resistance improvement effect saturated, but there is also a case where the value of the alternating impedance of the metal-carbon fiber reinforced resin material composite 11 is low, which is not preferable.

The average film thickness A of the electrodeposition film 4 is measured by observing the electrodeposition film 4 on the CFRP layer 3 using a scanning electron microscope at a magnification of 2000 times. The electrodeposition film 4 on the CFRP layer 3 is observed in a total of 10 visual fields, and the film thickness of the electrodeposition film is measured at an arbitrary place in each visual field. The average value of the 10 visual fields is regarded as the average film thickness A of the electrodeposition film.

Hitherto, the metal-carbon fiber reinforced resin material composite 11 has been described as an example of the metal-carbon fiber reinforced resin material composite according to the present embodiment.

MODIFICATION EXAMPLES

Hereinafter, several modification examples of the above-described embodiment of the present invention will be described. Individual modification examples to be described below may be applied to the embodiment of the present invention singly or may be applied to the embodiment of the present invention in combination. In addition, each modification example may be applied in place of the configuration described in the above-described embodiment of the present invention or may be additively applied to the configuration described in the above-described embodiment of the present invention.

FIG. 3 to FIG. 7 are each a schematic cross-sectional view of a metal-carbon fiber reinforced resin material composite according to a modification example of the present invention. Hereinafter, similar configuration elements will be differentiated by adding different alphabets to the end of the same reference sign. However, among similar configuration elements, a configuration element having substantially the same functional configuration as a configuration element that has been already described will not be described again.

<<Metal-Carbon Fiber Reinforced Resin Material Composite 11A>>

Figure 3:
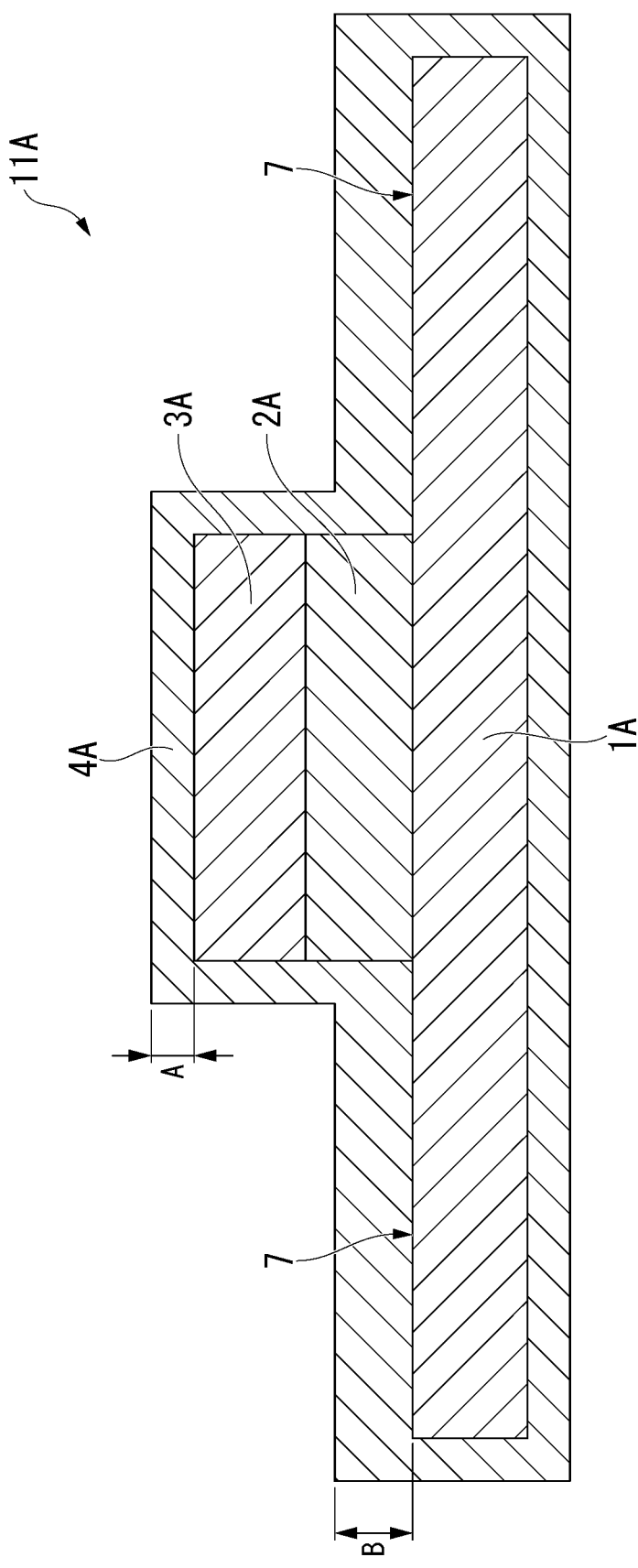
FIG. 3 is a cross-sectional schematic view of a metal-carbon fiber reinforced resin material composite according to a modification example of the present invention in a lamination direction.

A metal-carbon fiber reinforced resin material composite 11A shown in FIG. 3 includes a metal member 1A, a coating layer 2A that is disposed on a part of the metal member 1A, a CFRP layer 3A that is disposed through the coating layer 2A, and an electrodeposition film 4A. The electrodeposition film 4A is disposed to cover at least all of the surfaces of the CFRP layer 3A, the interface between the metal member 1A and the coating layer 2A, and the interface between the coating layer 2A and the CFRP layer 3A. In addition, on the surface of the metal member 1A, there are regions in which the coating layer 2A is not disposed (referred to as first regions 7). Hereinafter, the same configuration and the same function as the metal-carbon fiber reinforced resin material composite 11 will not be described again, and only a difference will be described.

(Relationship Between Average Film Thickness A and Average Film Thickness B)

In the electrodeposition coating, since a voltage is applied and the particles are drawn close to the application object, the film thickness of the electrodeposition film 4A depends on the conductivity of the application object. Therefore, the average film thickness B of the electrodeposition film 4A formed on the first regions 7 is formed on the metal member 1A with a low alternating impedance, and thus there is a likelihood that the film thickness may become thick compared with a case where the electrodeposition film 4A is formed on the CFRP layer 3. In the metal-carbon fiber reinforced resin material composite 11A, the average film thickness A and the average film thickness B satisfy the following formula (1).

$$B > 10 \times A \quad (1)$$

In a configuration that satisfies the formula (1), since the electrodeposition film 4A thickly covers the interfacial end portions between the metal member 1A and the coating layer 2A, it is possible to prevent the intrusion of water, saline water, or the like, which acts as a cause for corrosion, from the interfacial end portions, and the corrosion resistance of the metal-carbon fiber reinforced resin material composite 11 further improves.

<<Metal-Carbon Fiber Reinforced Resin Material Composite 11B>>

Figure 4:
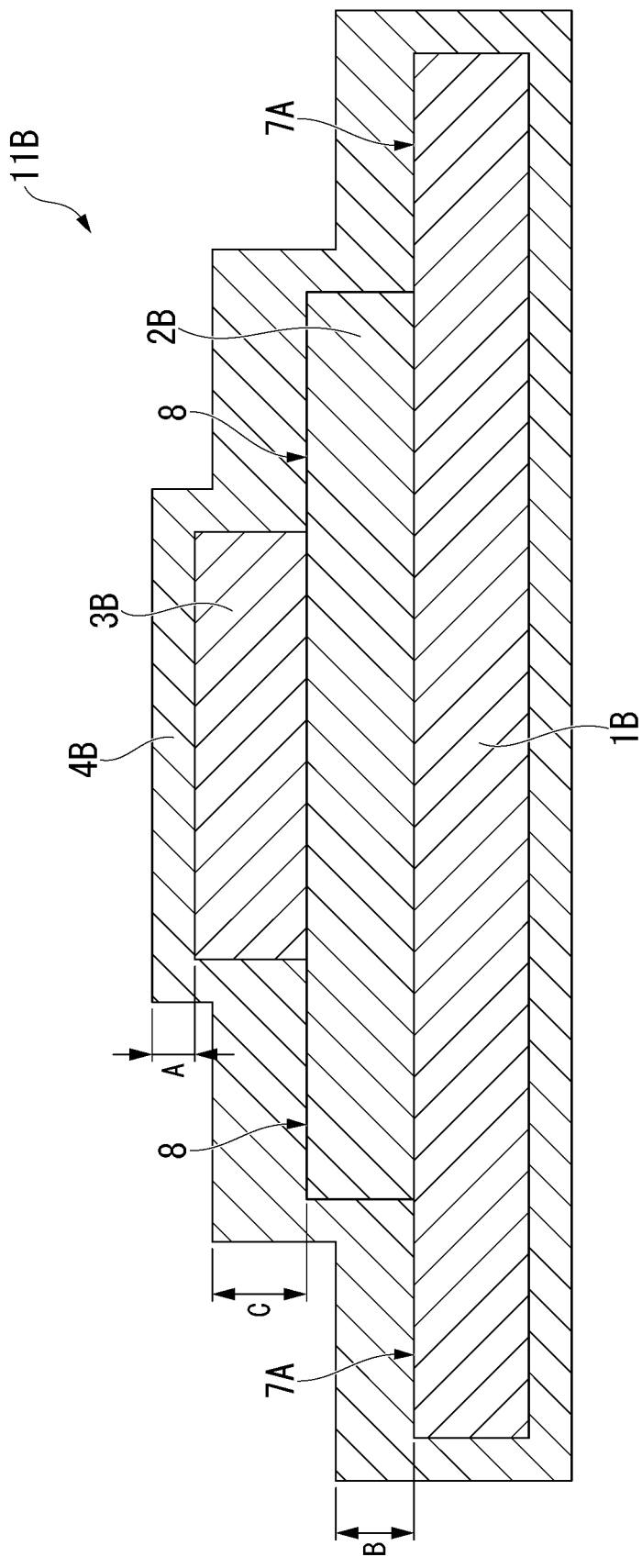
FIG. 4 is a cross-sectional schematic view of a metal-carbon fiber reinforced resin material composite according to another modification example of the present invention in a lamination direction.

A metal-carbon fiber reinforced resin material composite 11B shown in FIG. 4 includes a metal member 1B, a coating layer 2B that is disposed on a part of the metal member 1B, a CFRP layer 3B that is disposed through the coating layer 2B, and an electrodeposition film 4B. The electrodeposition film 4B is disposed to cover at least all of the surfaces of the CFRP layer 3B, the interface between the metal member 1B and the coating layer 2B, and the interface between the coating layer 2B and the CFRP layer 3B. In addition, on the surface of the metal member 1B, there are first regions 7A in which the coating layer 2B is not disposed. On the surface of the coating layer 2B, there are regions in which the CFRP layer 3B is not disposed (referred to as second regions 8). In addition, hereinafter, the same configuration and the same function as the metal-carbon fiber reinforced resin material composite 11A will not be described again, and only a difference will be described.

(Relationship Between Average Film Thickness A and Average Film Thickness C)

The average film thickness C of the electrodeposition film 4B on the second region 8 is formed on the coating layer 2B having a lower alternating impedance than the CFRP layer 3B and thus, possibly, becomes thicker than the average film thickness A. In the metal-carbon fiber reinforced resin material composite 11B, the average film thickness A and the average film thickness C of the electrodeposition film 4B satisfy the following formula (2).

$$5 \, \mu m > C > A \quad (2)$$

When the metal-carbon fiber reinforced resin material composite 11B has a configuration that satisfies the formula (2), since the electrodeposition film 4B thickly covers the interfacial end portions of the coating layer 2B and the CFRP layer 3B, it is possible to prevent the intrusion of water, saline water, or the like, which acts as a cause for corrosion, from the interfacial end portions of the coating layer 2B and the CFRP layer 3B.

<<Metal-Carbon Fiber Reinforced Resin Material Composite 11C>>

Figure 5:
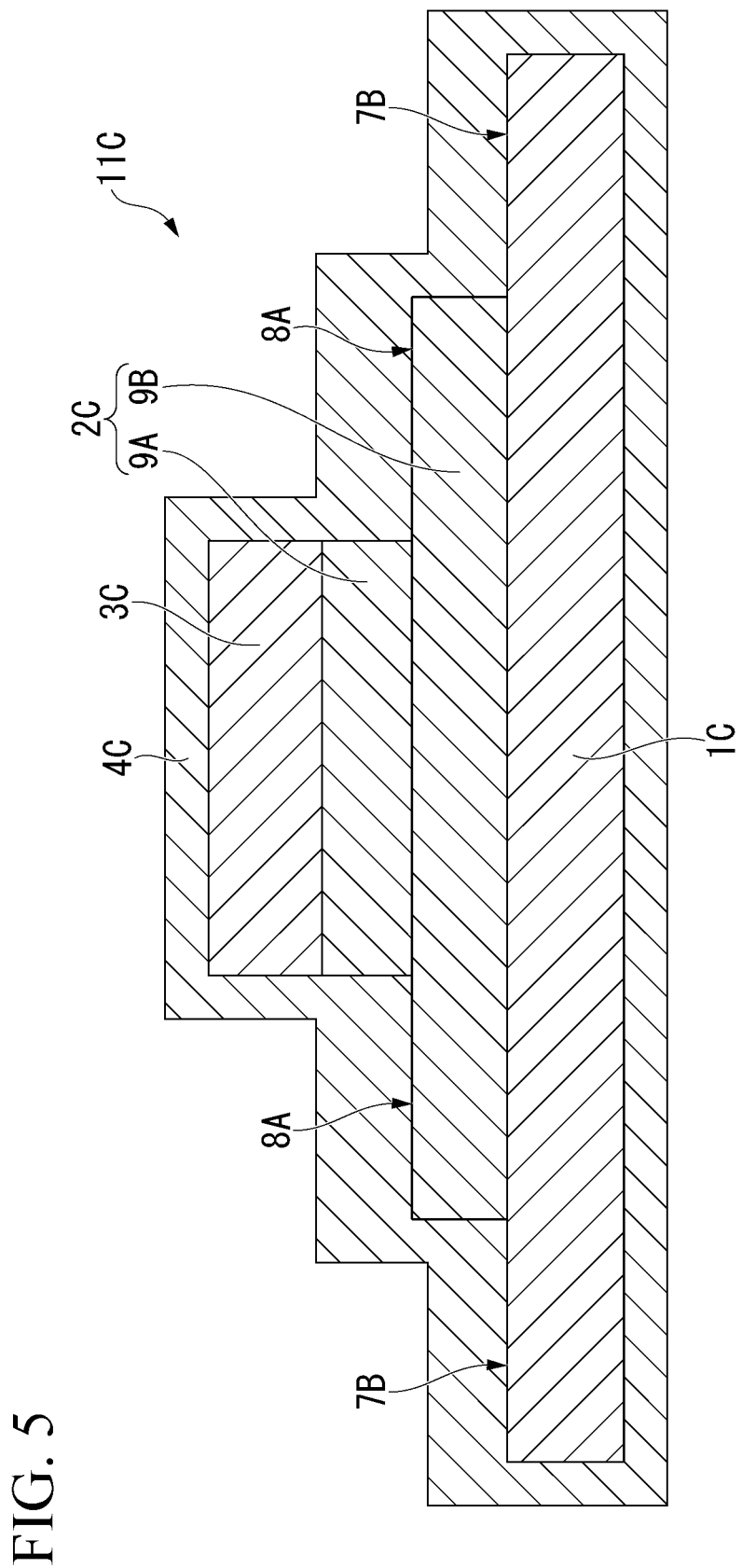
FIG. 5 is a cross-sectional schematic view of a metal-carbon fiber reinforced resin material composite according to another modification example of the present invention in a lamination direction.

A metal-carbon fiber reinforced resin material composite 11C shown in FIG. 5 includes a metal member 1C, a coating layer 2C that is disposed on a part of the metal member 1C, a CFRP layer 3C that is disposed through the coating layer 2C, and an electrodeposition film 4C. The electrodeposition film 4C is disposed to cover at least all of the surfaces of the CFRP layer 3C, the interface between the metal member 1C and the coating layer 2C, and the interface between the coating layer 2C and the CFRP layer 3C. In addition, on the surface of the metal member 1C, there are first regions 7B in which the coating layer 2C is not disposed. On the surface of the coating layer 2C, there are second regions 8A in which the CFRP layer 3C is not disposed. Hereinafter, the same configuration and the same function as the metal-carbon fiber reinforced resin material composite 11B will not be described again, and only a difference will be described.

(Coating Layer 2C)

The coating layer 2C consists of resin layers 9A and 9B as shown in FIG. 5. The resin layer 9A is disposed on a part of the surface of the resin layer 9B. The resin layer 9A can be made of the same resin as the above-described coating layer 2. A resin in the resin layer 9B more preferably contains a thermosetting polyester melamine resin and further contains a resin obtained by blending a urethane resin into a thermosetting polyester melamine resin. Since this resin is a resin capable of satisfying both the processability and the barrier property, the film is unlikely to be cleaved by pressing, and it is possible to suppress a decrease in the alternating impedance in the electrolytic solution. The film thicknesses of the resin layers 9A and 9B are, for example, 10 μm or more and 100 μm or less. When the film thicknesses are 10 μm or less, it is not possible for the resin layers to have a sufficient barrier property, and there is a likelihood that the alternating impedance may decrease in the electrolytic solution. In addition, when the film thicknesses exceed 100 μm, the processability deteriorates, there is also a likelihood that the film may cleaved by pressing, and there is a concern that the alternating impedance of the metal-carbon fiber reinforced resin material composite 11 may decrease. A more preferable range of the film thicknesses of the resin layers 9A and 9B is 20 μm or more and 80 μm or less.

<<Metal-Carbon Fiber Reinforced Resin Material Composite 11D>>

Figure 6:
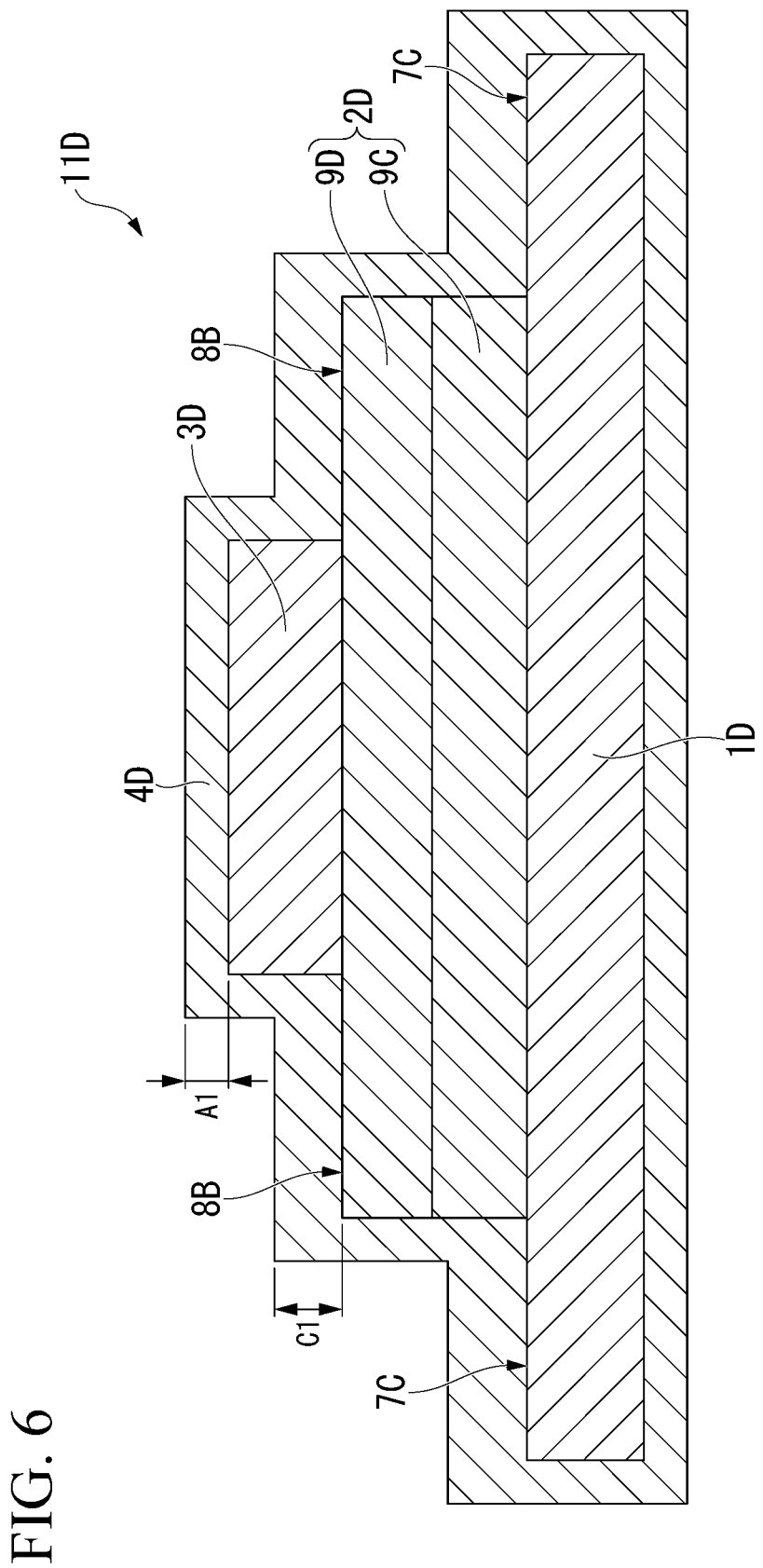
FIG. 6 is a cross-sectional schematic view of a metal-carbon fiber reinforced resin material composite according to another modification example of the present invention in a lamination direction.

A metal-carbon fiber reinforced resin material composite 11D shown in FIG. 6 includes a metal member 1D, a coating layer 2D that is disposed on a part of the metal member 1D, a CFRP layer 3D that is disposed through the coating layer 2D, and an electrodeposition film 4D. The electrodeposition film 4D is disposed to cover at least all of the surfaces of the CFRP layer 3D, the interface between the metal member 1D and the coating layer 2D, and the interface between the coating layer 2D and the CFRP layer 3D. In addition, on the surface of the metal member 1D, there are first regions 7C in which the coating layer 2D is not disposed. On the surface of the coating layer 2D, there are second regions 8B in which the CFRP layer 3D is not disposed. The coating layer 2D includes resin layers 9D and 9C. Hereinafter, the same configuration as the metal-carbon fiber reinforced resin material composite 11C will not be described again, and only a difference will be described.

(Relationship Between Average Film Thickness A1 and Average Film Thickness C1)

The average film thickness C1 of the electrodeposition film 4D on the second region 8B is formed on the coating layer 2D having a higher alternating impedance than the coating layer 2B of the metal-carbon fiber reinforced resin material composite 11B. Therefore, the average film thickness C1 becomes thinner than the average film thickness C of the electrodeposition film 4B on the second region 8 of the metal-carbon fiber reinforced resin material composite 11B. In the metal-carbon fiber reinforced resin material composite 11D, the average film thickness A1 on the CFRP layer 3D and the average film thickness C1 of the electrodeposition film 4D satisfy the following formula (2).

$$3 \, \mu m > C1 > A1 \quad (3)$$

When the metal-carbon fiber reinforced resin material composite 11D has a configuration that satisfies the formula (3), since the electrodeposition film 4D thickly covers the boundary between the coating layer 2D and the CFRP layer 3D, it is possible to prevent the intrusion of water, saline water, or the like, which acts as a cause for corrosion, from the interfacial end portions of the coating layer 2D and the CFRP layer 3D.

<<Metal-Carbon Fiber Reinforced Resin Material Composite 11E>>

Figure 7:
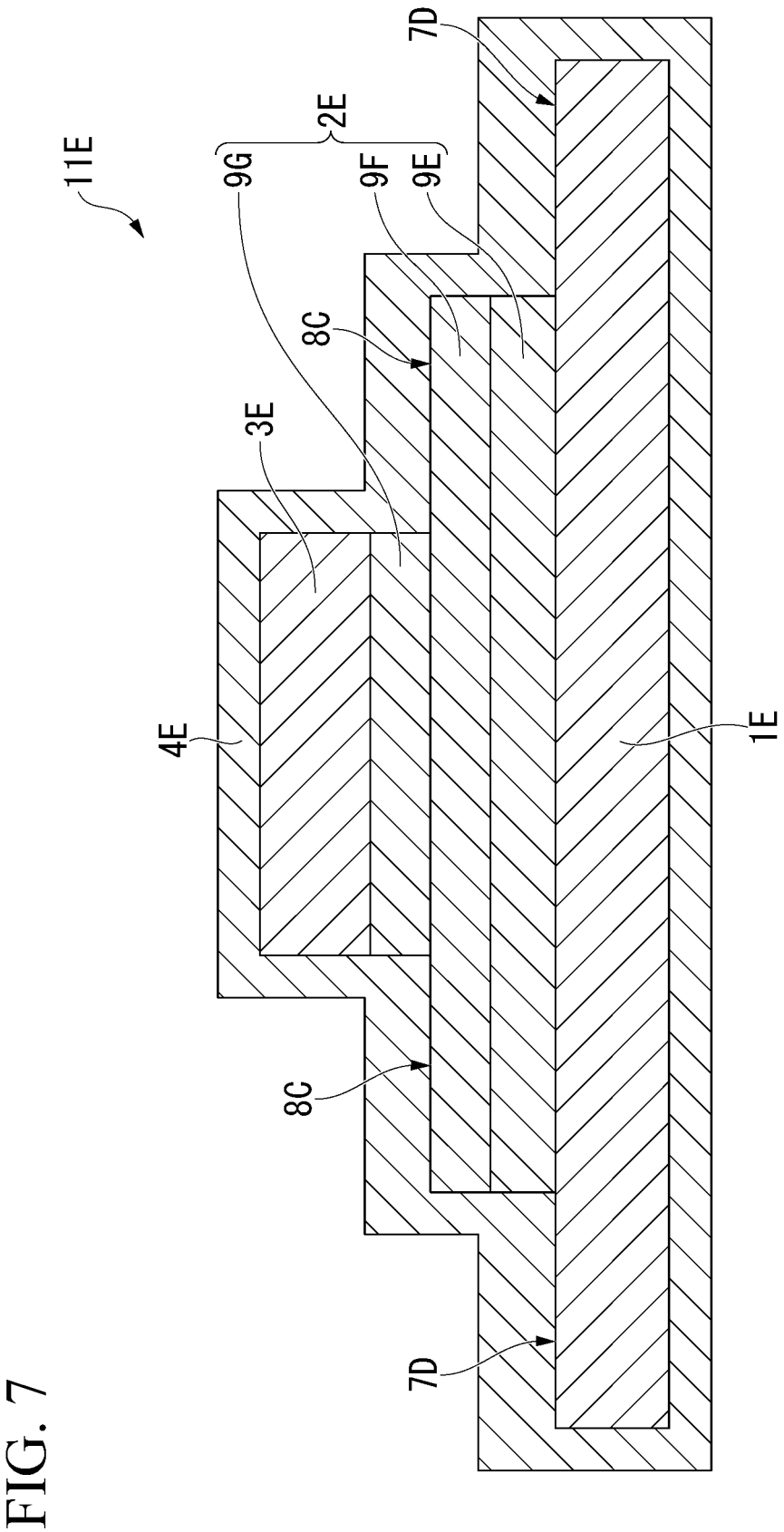
FIG. 7 is a cross-sectional schematic view of a metal-carbon fiber reinforced resin material composite according to another modification example of the present invention in a lamination direction.

A metal-carbon fiber reinforced resin material composite 11E shown in FIG. 7 includes a metal member 1E, a coating layer 2E that is disposed on a part of the metal member 1E, a CFRP layer 3E that is disposed through the coating layer 2E, and an electrodeposition film 4E. The electrodeposition film 4E is disposed to cover at least all of the surfaces of the CFRP layer 3E, the interface between the metal member 1E and the coating layer 2E, and the interface between the coating layer 2E and the CFRP layer 3E. In addition, on the surface of the metal member 1E, there are first regions 7D in which the coating layer 2E is not disposed. On the surface of the coating layer 2E, there are second regions 8C in which the CFRP layer 3E is not disposed. Hereinafter, the same configuration and the same function as the metal-carbon fiber reinforced resin material composite 11D will not be described again, and only a difference will be described.

(Coating Layer 2E)

The coating layer 2E includes rein layers 9E, 9F, and 9G. In addition, interfaces are provided between the resin layer 9E and the resin layer 9F and between the resin layer 9F and the resin layer 9G, respectively. Since the coating layer 2E includes the plurality of interfaces, the alternating impedance in the electrolytic solution is higher than those of the coating layers 2C and 2D. The reason for the alternating impedance in the electrolytic solution being increased by an increase in the number of the interfaces in the coating layer 2E is not evident, but is assumed that the bonding between both resins becomes stronger in the interface and the melamine resin or the like in the coating resin concentrates on the surface, which increases the alternating impedance. In the coating layer 2E made up of the plurality of resin layers, the number of layers is more preferably as large as possible in terms of increasing the alternating impedance. However, in the case of forming the coating layer 2E made up of four or more layers, it is difficult to paint the coating layer 2E by a single threading process in terms of the line configuration, and thus the number of layers is more preferably two or three. A preferable film thickness of the coating layer 2E is 10 μm or more and 100 μm or less. When the film thickness is 10 μm or less, it is not possible for the coating layer 2E to have a sufficient barrier property, and there is a likelihood that the alternating impedance may decrease in the electrolytic solution. In addition, when the film thickness exceeds 100 μm, the processability deteriorates, there is also a likelihood that the film may be cleaved by pressing, and there is a concern that the alternating impedance in the electrolytic solution may decrease. The film thickness of the coating layer 2E is more preferably 20 μm or more and 80 μm or less. Regarding the single layer film thickness of the resin layer 9E, 9F, or 9G, the film thickness of each resin layer is not particularly limited as long as the film thickness of the coating layer 2E made up of the plurality of layers is within the above-described range.

As the resin for the resin layer 9E, it is possible to use the same resin as the resin that is used for the coating layer 2. As the resin that is used for the resin layers 9F and 9G, it is possible to use the same resin as the resin that is used for the resin layer 9B.

Hitherto, the configurations of the metal-carbon fiber reinforced resin material composites 11A to 11E have been described with reference to FIG. 3 to FIG. 7. In all of the metal-carbon fiber reinforced resin material composites 11A to 11E, the alternating impedances at a frequency of 1 Hz at the time of immersing the metal-carbon fiber reinforced resin material composite in a 5 mass % sodium chloride aqueous solution are $1 \times 10^7 \Omega$ to $1 \times 10^9 \Omega$. In these cases, the material and film thickness of each layer are appropriately set so as to appropriately satisfy the above-described alternating impedance.

<Method for Manufacturing Metal-Carbon Fiber Reinforced Resin Material Composite>

Next, a method for manufacturing the metal-carbon fiber reinforced resin material composite according to the embodiment of the present invention will be described.

The method for manufacturing the metal-carbon fiber reinforced resin material composite 11 has a step of applying the coating layer 2 to at least a part of the surface of the metal member 1 on which forming has been carried out, a step of, furthermore, thermally compressing (attaching or thermally fusing) the CFRP layer 3 (a CFRP or a pre-preg for forming the CFRP) to at least a part of the surface of the coating layer 2, and a step of forming the electrodeposition film by carrying out degreasing, surface adjustment, chemical conversion treatment, electrodeposition coating, and the painting of the electrodeposition film by baking on a member to which the CFRP layer 3 has been attached. In a case where a thermosetting resin is contained in the coating layer 2, the method for manufacturing the metal-carbon fiber reinforced resin material composite 11 further includes a step of baking the coating layer 2. In a case where a surface treatment is carried out on the metal member 1, the method for manufacturing the metal-carbon fiber reinforced resin material composite 11 further includes a surface treatment step.

Each step for the degreasing, the surface adjustment, the chemical conversion treatment, the electrodeposition coating, or the baking of the electrodeposition film is preferably an ordinary method that is used for automobile vehicle bodies.

Since the metal-carbon fiber reinforced resin material composites 11A to 11E can also be manufactured by the same method as described above, hereinafter, only the method for manufacturing the metal-carbon fiber reinforced resin material composite 11 will be described.

A step of applying a paint for the coating layer 2 is not particularly limited, and, in the case of a viscous liquid, it is possible to use an ordinarily well-known method such as coating in which the paint is ejected from a slit nozzle or a circular nozzle, brush coating, blade coating, or spatula coating. As a step of applying a paint dissolved in a solvent, it is possible to use an ordinarily well-known method, for example, brush coating, spray coating, bar coater, ejection coating from nozzles with a variety of shapes, die coating, curtain coating, roll coating, screen printing, inkjet coating, or the like. In the case of a powder-form paint, as the step of applying the paint, it is possible to use a well-known method such as powder painting. In a case where the coating layer 2 includes a plurality of layers, for example, a step of applying and drying a paint may be repeated a plurality of times.

In the case of carrying out a surface treatment for painting on the metal member 1, it is possible to use an ordinarily well-known treatment method, for example, an immersion drying method, an immersion, water washing, and drying method, a spraying, water washing, and drying method, an application and drying method, an application and drying curing method, or the like. As the application method, it is possible to use an ordinarily well-known method such as brush coating, spraying, roll coating, bar coating, or blade coating.

In addition, drying and baking can be carried out by, for example, a heating treatment or the like. The heating conditions are not particularly limited, and the electrodeposition paint can be heated, for example, for 10 seconds or longer and 30 minutes or shorter at a temperature of 80° C. or higher and 250° C. or lower.

Next, the thermal compression step will be described. The coating layer 2 is formed on at least a part of the metal member 1, and then the pre-preg for forming the CFRP or the CFRP is disposed on the coating layer 2, thereby obtaining a laminate. In the case of using a CFRP on which the pre-preg has been laminated, the attachment surface of the CFRP preferably has been, for example, roughened by a blast treatment or the like or activated by a plasma treatment, a corona treatment, or the like. Next, this laminate is heated and pressurized (thermally compressed), whereby the CFRP layer 3 is formed on the coating layer 2.

Here, the thermal compression conditions in the present step are as described below.

The thermal compression temperature is not particularly limited, but is within a range of 200° C. or higher and 250° C. or lower. Within such a temperature range, when the resin that configures the metal-carbon fiber reinforced resin material composite 11 is a crystalline resin, a temperature of the melting point or higher is more preferable, and, when the resin is a non-crystalline resin, a temperature of Tg+150° C. or higher is more preferable. When the thermal compression temperature is higher than 250° C., since excess heat is applied, there is a likelihood that the resin may decompose, which is not preferable. In addition, when the thermal compression temperature is lower than 200° C., the melt viscosity of the resin that configures the metal-carbon fiber reinforced resin material composite 11 is high, and the carbon fiber material 21 is not impregnated with the resin that configures the metal-carbon fiber reinforced resin material composite 11, which makes the value of the alternating impedance of the metal-carbon fiber reinforced resin material composite 11 fail to satisfy $1\times10^7\Omega$ to $1\times10^9\Omega$, which is not preferable.

The pressure at the time of the thermal compression is, for example, preferably 3 MPa or higher and more preferably within a range of 3 MPa or higher and 5 MPa or lower. When the pressure is higher than 5 MPa, there is a case where it is not possible for the value of the alternating impedance of the metal-carbon fiber reinforced resin material composite 11 to satisfy $1\times10^7\Omega$ or more due to the deformation or the like of the metal-carbon fiber reinforced resin material composite 11, which is not preferable. In addition, when the pressure is lower than 3 MPa, the impregnation property with respect to the carbon fiber material 21 of the resin that configures the metal-carbon fiber reinforced resin material composite 11 becomes poor, and there is a case where it is not possible for the value of the alternating impedance to satisfy $1\times10^7\Omega$ or more, which is not preferable.

When the thermal compression time is at least three minutes, it is possible to sufficiently heat and compress the CFRP layer 3, and the thermal compression time is preferably within a range of five minutes or longer and 20 minutes or shorter. When the thermal compression time is longer than 20 minutes, the resin in the CFRP layer 3 deteriorates due to heat, and there is a case where it is not possible for the value of the alternating impedance to satisfy $1\times10^7\Omega$ or more, which is not preferable.

The method for the electrodeposition coating is not particularly limited, and it is possible to carry out the electrodeposition painting by a well-known method.

Hitherto, the example of the method for manufacturing the metal-carbon fiber reinforced resin material composite 11 has been described. On the obtained metal-carbon fiber reinforced resin material composite 11, a post step may be carried out as appropriate. In the post step on the metal-carbon fiber reinforced resin material composite 11, in addition to painting, punching in order for mechanical joining with other members with a bolt, by rivet fastening, or the like, the application of an adhesive for adhesive joining, or the like is carried out as necessary.

Example 1

Hereinafter, the present invention will be described in more detail using an example. The example to be described below is simply an example of the present invention and does not limit the present invention.

<Manufacturing of Metal-Carbon Fiber Reinforced Resin Material Composite>

(Preparation of Metal Member (Metal Sheet))

Steel having components of C: 0.131 mass %, Si: 1.19 mass %, Mn: 1.92%, P: 0.009 mass %, S: 0.0025 mass %, Al: 0.027 mass %, and N: 0.0032 mass % with a remainder of Fe was hot-rolled, pickled, and cold-rolled, thereby obtaining 0.1 mm-thick cold-rolled steel sheets. Next, the produced cold-rolled steel sheets were annealed with a continuous annealing device under conditions under which the highest sheet temperature reached became 820° C. The gas atmosphere in an annealing furnace during the annealing step was set to a $N_2$ atmosphere containing 1.0 vol % of $H_2$. The produced cold-rolled steel sheet will be referred to as "CR". In addition, additional steel sheets were prepared by annealing the produced cold-rolled steel sheets in an annealing step with a continuous hot-dip plating device having an annealing step under conditions under which the highest sheet temperature reached became 820° C. and then carrying out hot-dip galvanization thereon in a plating step. The gas atmosphere in an annealing furnace during the annealing step was set to a $N_2$ atmosphere containing 1.0 vol % of $H_2$. As plates, four types of plates such as Zn-0.2% Al (referred to as "GI"), Zn-0.09% Al (referred to as "GA"), Zn-1.5% Al-1.5% Mg (referred to as "Zn—Al—Mg"), and Zn-11% Al-3% Mg-0.2% Mg (referred to as "Zn—Al—Mg—Si") were used. For steel sheets for which a hot-dip plating bath of the Zn-0.09% Al plate was used, the steel sheets were immersed in the hot-dip plating bath, gas wiping was carried out by blowing $N_2$ gas from a slit nozzle while pulling the steel sheets out from the plating bath to adjust the amounts of the plate attached, the steel sheets were heated at a sheet temperature of 480° C. with an induction heater to alloy the steel sheets, and Fe in the steel sheets was diffused into the plate layers.

The tensile strengths of the produced metal sheets were measured and all found out to be 980 MPa. In addition, the amounts of the plates attached to the plated steel sheets were set to 45 g/m² for GA and 60 g/m² for plates other than GA. The sizes of the produced steel sheets were all 100 mm×200 mm.

In addition, as metal sheets other than the above-described steel sheets, aluminum sheets (hereinafter, referred to as "AL") were also separately prepared. As the aluminum sheets (AL), 6000-series aluminum sheets (A6061, sheet thickness: 1 mm) manufactured by Nippon Testpanel Co., Ltd. were used.

(Pretreatment Step)

Some of the metal sheets (Nos. 22 to 40) were degreased with an alkali degreasing agent "FINE CLEANER E6404" manufactured by Nihon Parkerizing Co., Ltd., and an aqueous solution to which γ-aminopropyltriethoxysilane (2.5 g/L), water-dispersible silica ("SNOWTEX N" manufactured by Nissan Chemical Corporation (1 g/L), and a water-soluble acrylic resin (polyacrylic acid of a reagent) (3 g/L) were added was applied onto the steel sheets with a bar coater and dried with an hot-air oven under conditions under which the sheet temperature reached became 150° C. In addition, the amount of silica attached was set to 10 mg/m² in terms of Si. As a method for measuring the amount of silica attached, measurement is carried out using a fluorescent x ray, a calibration curve is drawn from the relationship between the obtained detection intensities and the calculated amounts of silica attached, and the amount of silica attached can be obtained using the calibration curve.

(Coating Layer Formation Step)

The following paints were produced.

Paint A: A melamine resin (CYMEL 325 manufactured by Mitsui Cyanamid) was added to a polyester resin (VYLON 103 manufactured by Toyobo Co., Ltd., glass transition temperature: 47° C.) in a mass ratio per solid content of 80/20 (VYLON/CYMEL) and cyclohexanone was added thereto as necessary, thereby producing a paint A.

Paint B: A melamine resin (CYMEL 325 manufactured by Mitsui Cyanamid) was added to a polyester resin (VYLON 550 manufactured by Toyobo Co., Ltd., glass transition temperature: −15° C.) in a mass ratio per solid content of 80/20 (VYLON/CYMEL) and cyclohexanone was added thereto as necessary, thereby producing a paint B.

Paint C: A melamine resin (CYMEL 325 manufactured by Mitsui Cyanamid) was added to a water-based urethane resin (SUPERFLEX 150 manufactured by DKS Co., Ltd., glass transition temperature: 40° C.) in a mass ratio per solid content of 80/20 (SUPERFLEX/CYMEL) and water was added thereto as necessary, thereby producing a paint C.

Paint D: A polyamine (LUCKAMIDE TD-993 manufactured by DIC Corporation) was added to an epoxy resin (EPICLON 850-S manufactured by DIC Corporation) in a mass ratio per solid content of 70/30 (EPICLON/LUCKAMIDE). At the end, a spacer for film thickness adjustment (glass beads) was added to the mixture of the epoxy resin and the polyamine in a mass ratio per solid content of 99.5/0.5 (mixture of epoxy resin and polyamine/glass beads), thereby producing a paint D. In addition, the paint D was diluted with cyclohexanone such that the total solid content mass rate reached 50%.

Paint E: A water-based urethane resin (ADEKA BONTIGHTER HUX-232 manufactured by ADEKA Corporation) and an epoxy resin (ADEKA RESIN EN-0461N manufactured by ADEKA Corporation) were added to a water-based urethane resin (SUPERFLEX 470 manufactured by DKS Co., Ltd., glass transition temperature: −31° C.) in a mass ratio per solid content of 80/15/5 (SUPERFLEX/ADEKA BONTIGHTER/ADEKA RESIN) and water was added thereto as necessary, thereby producing a paint E.

A coating layer was formed on each metal sheet using, among the produced paints, a paint shown in Table 1. Among the produced paints, the paints A to C and E were applied onto the metal sheets on which the pretreatment had been carried out and baked in an oven such that the highest temperature reached became 200° C., thereby producing the coating layers. The paints were applied with the winding diameter of the bar coater and dilution conditions changed to obtain predetermined film thicknesses. In a case where the coating layer was made up of a plurality of resin layers, for layers other than the uppermost layer, the paint was baked such that the highest temperature reached became 160° C., and, for the uppermost layer, the paint was baked at 200° C. In addition, in a case where the coating layer was made up of a plurality of resin layers, the coating layer was formed with the application area on each resin layer changed to obtain a configuration of a composite material shown in Table 2.

After that, the steel sheets having the coating layer were cut by shearing to 80 mm×150 mm (20 mm×80 mm in the configuration of FIG. 1).

The paint D was applied to a 20 mm×80 mm central portion (40 mm×100 mm in the configuration of FIG. 4) on the metal sheet cut by shearing to 80 mm×150 mm (20 mm×80 mm in the configuration of FIG. 1), after that, a 20 mm×80 mm CFRP described below was attached to the paint-applied place, degreased, surface-adjusted, chemically converted, coated by electrodeposition, and baked at the same time of the baking of an electrodeposition film. The baking conditions were set to 30 minutes in an oven having a set temperature of 170° C.

(CFRP Pre-Preg Production Step)

CFRP pre-preg 1: A reinforced fiber base material made of a carbon fiber (cloth material: manufactured by Toho Tenax Co., Ltd., IMS60) was painted with a powder having an average particle diameter D50 of 80 μm obtained by pulverizing and classifying a bisphenol A-type phenoxy resin "PHENOTOTO YP-50S" manufactured by Nippon Steel & Sumikin Chemical Co., Ltd. (Mw=40,000, hydroxyl equivalent=284 g/eq., melt viscosity at 250° C.=90 Pa·s, Tg=83° C.) in an electrostatic field under conditions of a charge of 70 kV and a blown air pressure of 0.32 MPa. After that, the powder was heated and melted in an oven at 170° C. for one minute to thermally fuse the resin, thereby producing a phenoxy resin CFRP pre-preg 1 having a thickness of 0.65 mm, an elastic modulus of 75 [GPa], a tensile load of 13500 [N], and a fiber volume content rate (Vf) of 60%.

As the average particle diameter of the pulverized and classified phenoxy resin, the particle diameter was measured with a laser diffraction and scattering-type particle diameter distribution measuring instrument (MICROTRAC S3300EX, manufactured by Nikkiso Co., Ltd.) when the cumulative volume reached 50% in terms of the volume. In the production of the following CFRP pre-pregs, the average particle diameters were measured in the same manner.

CFRP pre-preg 2: A reinforced fiber base material made of a carbon fiber (cloth material: manufactured by Toho Tenax Co., Ltd., IMS60) was painted with a powder having an average particle diameter D50 of 80 μm obtained by heating a bisphenol A-type phenoxy resin "PHENOTOTO YP-50S" manufactured by Nippon Steel & Sumikin Chemical Co., Ltd. (Mw=40,000, hydroxyl equivalent=284 g/eq., melt viscosity at 250° C.=90 Pa·s, Tg=83° C.) to 200° C., adding hydrophobic silica (AEROSIL RY 50 manufactured by Nippon Aerosil Co., Ltd.) in a mass ratio per solid content of 99/1 (PHENOTOTO/AEROSIL), uniformly dispersing and cooling the components, then, pulverizing and classifying the mixture in an electrostatic field under conditions of a charge of 70 kV and a blown air pressure of 0.32 MPa. After that, the powder was heated and melted in an oven at 170° C. for one minute to thermally fuse the resin, thereby producing a phenoxy resin CFRP pre-preg 2 having a thickness of 0.65 mm, an elastic modulus of 75 [GPa], a tensile load of 13500 [N], and a fiber volume content rate (Vf) of 60%.

CFRP pre-preg 3: A reinforced fiber base material made of a carbon fiber (cloth material: manufactured by Toho Tenax Co., Ltd., IMS60) was painted with a powder having an average particle diameter D50 of 80 μm obtained by heating a bisphenol A-type phenoxy resin "PHENOTOTO YP-50S" manufactured by Nippon Steel & Sumikin Chemical Co., Ltd. (Mw=40,000, hydroxyl equivalent=284 g/eq., melt viscosity at 250° C.=90 Pa·s, Tg=83° C.) to 200° C., adding hydrophobic silica (AEROSIL RY 50 manufactured by Nippon Aerosil Co., Ltd.) in a mass ratio per solid content of 92/8 (PHENOTOTO/AEROSIL), uniformly dispersing and cooling the components, then, pulverizing and classifying the mixture in an electrostatic field under conditions of a charge of 70 kV and a blown air pressure of 0.32 MPa. After that, the powder was heated and melted in an oven at 170° C. for one minute to thermally fuse the resin, thereby producing a phenoxy resin CFRP pre-preg 3 having a thickness of 0.65 mm, an elastic modulus of 75 [GPa], a tensile load of 13500 [N], and a fiber volume content rate (Vf) of 60%.

CFRP pre-preg 4: A reinforced fiber base material made of a carbon fiber (cloth material: manufactured by Toho Tenax Co., Ltd., IMS60) was painted with a powder having an average particle diameter D50 of 80 μm obtained by pulverizing and classifying Nylon 6 of an ordinary reagent in an electrostatic field under conditions of a charge of 70 kV and a blown air pressure of 0.32 MPa. After that, the powder was heated and melted in an oven at 170° C. for one minute to thermally fuse the resin, thereby producing a nylon resin CFRP pre-preg 4 having a thickness of 0.65 mm, an elastic modulus of 75 [GPa], a tensile load of 13500 [N], and a fiber volume content rate (Vf) of 60%.

CFRP pre-preg 5: A powder (phenoxy powder) having an average particle diameter D50 of 80 μm obtained by pulverizing and classifying a bisphenol A-type phenoxy resin "PHENOTOTO YP-50S" manufactured by Nippon Steel & Sumikin Chemical Co., Ltd. (Mw=40,000, hydroxyl equivalent=284 g/eq., melt viscosity at 250° C.=90 Pa·s, Tg=83° C.) was produced. Next, a powder (nylon powder) having an average particle diameter D50 of 80 μm obtained by pulverizing and classifying Nylon 6 of an ordinary reagent was produced. In addition, the produced phenoxy powder and the produced nylon powder were mixed together at a mass ratio of 50/50 (PHENOTOTO/nylon 6) and stirred, thereby producing a powder containing 50% of the phenoxy powder. Next, a reinforced fiber base material made of a carbon fiber (cloth material: manufactured by Toho Tenax Co., Ltd., IMS60) was painted with the produced powder containing 50% of the phenoxy powder in an electrostatic field under conditions of a charge of 70 kV and a blown air pressure of 0.32 MPa. After that, the powder was heated and melted in an oven at 170° C. for one minute to thermally fuse the resin, thereby producing a phenoxy resin CFRP pre-preg 5 containing 50% of the phenoxy resin in the matrix resin and having a thickness of 0.65 mm, an elastic modulus of 75 [GPa], a tensile load of 13500 [N], and a fiber volume content rate (Vf) of 60%.

CFRP pre-preg 6: A bisphenol A-type phenoxy resin "PHENOTOTO YP-50S" manufactured by Nippon Steel & Sumikin Chemical Co., Ltd. (Mw=40,000, hydroxyl equivalent=284 g/eq., melt viscosity at 250° C.=90 Pa·s, Tg=83° C.) was heated and melted in an oven at 170° C. for one minute, thereby producing a 0.30 mm-thick phenoxy resin pre-preg 6.

(Formation of CFRP Layer)

The above-described CFRP pre-pregs were cut to 20 mm×80 mm, laminated in combination so as to obtain a predetermined thickness and a predetermined configuration, and thermally compressed (thermally fused or attached), thereby sticking the CFRP pre-preg laminate to a part or all of the surface of the metal sheet through the coating layer and obtaining a metal-carbon fiber reinforced resin material composite. In a case where the outermost surface of the coating layer was a thermoplastic resin, the CFRP pre-preg laminate was thermally fused to the outermost surface, and, in a case where the outermost surface of the coating layer was a thermosetting resin, the CFRP pre-preg laminate was attached to the outermost surface. The CFRP pre-preg laminate was thermally compressed by being pressed for three minutes at 3 MPa with a pressing machine having a flat mold heated to 250° C.

In addition, CFRPs 1 to 5 were each produced by overlapping two pieces of each of the 20 mm×80 mm produced CFRP pre-pregs 1 to 5 on the metal member on which the coating layer had been laminated and pressing the CFRP pre-preg pieces for three minutes at 3 MPa with a pressing machine having a flat mold heated to 250° C. to integrate the metal member and the CFRP.

In the sticking of the CFRP, the CFPR pre-pregs were disposed in the central portion on the metal sheet on which the coating layer had been laminated.

The type of the CFRP that was used in each sample is shown in Table 1. In the "CFRP" column of the table, the CFRPs 1 to 5 correspond to the CFRP pre-pregs 1 to 5 used, respectively.

CFRPs 6 and 7 were configured as described below, and the CFRP pre-pregs were stuck to the metal sheet through the coating layer by means of thermal fusion or attachment.

CFRP 6: The CFRP pre-preg 1 and the CFRP pre-pregs 6 were cut to 20 mm×80 mm, and the CFRP pre-preg 6, the CFRP pre-preg 1, and the CFRP pre-preg 6 were laminated in this order.

CFRP 7: A thermosetting resin CFRP (epoxy PAN-based CFRP (VF: 60%, size: 20 mm×80 mm, thickness: 1 mm) manufactured by Nippon Steel Chemical & Material Co., Ltd.) was used. The CFRP 7 was not laminated, but stuck to the metal sheet through the coating layer.

(Degreasing, Surface Adjustment, Chemical Conversion, and Electrodeposition)

Using the produced samples having a width of 80 mm and a length of 150 mm or a width of 20 mm and a length of 80 mm, degreasing, surface adjustment, and a zinc phosphate treatment were carried out, and then electrodeposition coating was carried out. The samples were degreased by immersing the samples for five minutes at a temperature of 60° C. using a degreasing agent "FINE CLEANER E6408" manufactured by Nihon Parkerizing Co., Ltd. The surfaces of the degreased samples were adjusted by immersing the degreased samples for five minutes at a temperature of 40° C. using "PREPALENE X" manufactured by Nihon Parkerizing Co., Ltd. After that, the samples were immersed for three minutes at a temperature of 35° C. using a zinc phosphate chemical conversion agent "PALBOND L3065" manufactured by Nihon Parkerizing Co., Ltd., thereby carrying out the zinc phosphate chemical conversion treatment of the samples. After the zinc phosphate treatment, the samples were washed with water and dried in an oven with a 150° C. atmosphere. After that, an electrodeposition paint "POWER FLOAT 1200" manufactured by Nippon Paint Industrial Coating Co., Ltd. was electrodeposited to coat the samples 15 μm and baked for 20 minutes in an oven having a 170° C. atmosphere, thereby producing metal-carbon fiber reinforced resin material composites.

The configurations of the obtained individual metal-carbon fiber reinforced resin material composite samples are shown in Table 1 and Table 2. Regarding the configurations of the composites in Table 1, the configuration of FIG. 1 is indicated by A, the configuration of FIG. 3 is indicated by B, the configuration of FIG. 4 is indicated by C, the configuration of FIG. 5 is indicated by D, and the configuration of FIG. 7 is indicated by E. In addition, "–" in Table 1 indicates that there is no resin layer for the corresponding item.

TABLE 1

| | | | Coating layer | | | | | |
| | | | Resin layer 1 (metal sheet side) | | Resin layer 2 (on CFRP side of resin layer 1) | | Resin layer 3 (on CFRP side of resin layer 2) | |
| No. | Metal sheet | Pre-treatment | Paint type | Film thickness (μm) | Paint type | Film thickness (μm) | Paint type | Film thickness (μm) |
|---|---|---|---|---|---|---|---|---|
| 1 | CR | No | D (Epoxy/polyamine) | 500 | — | — | — | — |
| 2 | CR | No | D (Epoxy/polyamine) | 500 | — | — | — | — |
| 3 | GA | Yes | A (Polyester/Tg47) | 60 | — | — | — | — |
| 4 | CR | No | D (Epoxy/polyamine) | 10 | — | — | — | — |
| 5 | CR | No | D (Epoxy/polyamine) | 50 | — | — | — | — |
| 6 | CR | No | D (Epoxy/polyamine) | 100 | — | — | — | — |
| 7 | CR | No | D (Epoxy/polyamine) | 500 | — | — | — | — |
| 8 | CR | No | D (Epoxy/polyamine) | 100 | — | — | — | — |
| 9 | CR | No | D (Epoxy/polyamine) | 250 | — | — | — | — |
| 10 | CR | No | D (Epoxy/polyamine) | 500 | — | — | — | — |
| 11 | CR | No | D (Epoxy/polyamine) | 10 | — | — | — | — |
| 12 | CR | No | D (Epoxy/polyamine) | 50 | — | — | — | — |
| 13 | CR | No | D (Epoxy/polyamine) | 250 | — | — | — | — |
| 14 | CR | No | D (Epoxy/polyamine) | 500 | — | — | — | — |
| 15 | CR | No | D (Epoxy/polyamine) | 800 | — | — | — | — |
| 16 | CR | No | D (Epoxy/polyamine) | 50 | — | — | — | — |
| 17 | CR | No | D (Epoxy/polyamine) | 50 | — | — | — | — |
| 18 | CR | No | D (Epoxy/polyamine) | 250 | — | — | — | — |
| 19 | CR | No | D (Epoxy/polyamine) | 250 | — | — | — | — |
| 20 | Cd | No | D (Epoxy/polyamine) | 250 | — | — | — | — |
| 21 | GA | No | D (Epoxy/polyamine) | 250 | — | — | — | — |
| 22 | Zn—Al—Mg | No | D (Epoxy/polyamine) | 250 | — | — | — | — |
| 23 | Zn—Al—Mg—Si | No | D (Epoxy/polyamine) | 250 | — | — | — | — |
| 24 | AL | No | D (Epoxy/polyamine) | 250 | — | — | — | — |
| 25 | GI | Yes | A (Polyester/Tg47) | 60 | — | — | — | — |
| 26 | GA | Yes | A (Polyester/Tg47) | 60 | — | — | — | — |
| 27 | Zn—Al—Mg | Yes | A (Polyester/Tg47) | 60 | — | — | — | — |
| 28 | Zn—Al—Mg—Si | Yes | A (Polyester/Tg47) | 60 | — | — | — | — |
| 29 | AL | Yes | A (Polyester/Tg47) | 60 | — | — | — | — |

TABLE 1-continued

|  |  |  | Coating layer | | | | | |
|---|---|---|---|---|---|---|---|---|
|  |  |  | Resin layer 1 (metal sheet side) | | Resin layer 2 (on CFRP side of resin layer 1) | | Resin layer 3 (on CFRP side of resin layer 2) | |
| No. | Metal sheet | Pre-treatment | Paint type | Film thickness (μm) | Paint type | Film thickness (μm) | Paint type | Film thickness (μm) |
| 30 | CR | Yes | E (water-based urethane/Tg-31 + epoxy) | 60 | — | — | — | — |
| 31 | CR | Yes | E (water-based urethane/Tg-31 + epoxy) | 60 | — | — | — | — |
| 32 | CR | Yes | E (water-based urethane/Tg-31 + epoxy) | 60 | — | — | — | — |
| 33 | CR | Yes | A (Polyester/Tg47) | 5 | D (Epoxy/polyamine) | 50 | — | — |
| 34 | CR | Yes | A (Polyester/Tg47) | 10 | D (Epoxy/polyamine) | 50 | — | — |
| 35 | CR | Yes | A (Polyester/Tg47) | 20 | D (Epoxy/polyamine) | 50 | — | — |
| 36 | CR | Yes | A (Polyester/Tg47) | 60 | D (Epoxy/polyamine) | 50 | — | — |
| 37 | CR | Yes | A (Polyester/Tg47) | 80 | D (Epoxy/polyamine) | 50 | — | — |
| 38 | CR | Yes | A (Polyester/Tg47) | 100 | D (Epoxy/polyamine) | 50 | — | — |
| 39 | CR | Yes | B (Polyester/Tg-15) | 60 | D (Epoxy/polyamine) | 50 | — | — |
| 40 | CR | Yes | C (Water-based urethane/Tg40) | 60 | D (Epoxy/polyamine) | 50 | — | — |
| 41 | CR | Yes | A (Polyester/Tg47) | 60 | D (Epoxy/polyamine) | 50 | — | — |
| 42 | CR | Yes | A (Polyester/Tg47) | 60 | D (Epoxy/polyamine) | 50 | — | — |
| 43 | CR | Yes | A (Polyester/Tg47) | 30 | A (Polyester/Tg47) | 30 | D (Epoxy/polyamine) | 50 |

TABLE 2

|  | CFRP | | Configuration of |  |
|---|---|---|---|---|
| No. | Type | Sticking method | composite material | Note |
| 1 | CFRP 1 (80 mm × 150 mm) | Adhesion, fully stuck | A | Example |
| 2 | CFRP 7 (80 mm × 150 mm) | Adhesion, fully stuck | A | Example |
| 3 | CFRP 1 (80 mm × 150 mm) | Thermal fusion, fully stuck | A | Example |
| 4 | CFRP 7 (20 mm × 80 mm) | Adhesion, partially stuck | B | Comparative example |
| 5 | CFRP 7 (20 mm × 80 mm) | Adhesion, partially stuck | B | Comparative example |
| 6 | CFRP 7 (20 mm × 80 mm) | Adhesion, partially stuck | B | Example |
| 7 | CFRP 7 (20 mm × 80 mm) | Adhesion, partially stuck | B | Example |
| 8 | CFRP 4 (20 mm × 80 mm) | Adhesion, partially stuck | B | Comparative example |
| 9 | CFRP 4 (20 mm × 80 mm) | Adhesion, partially stuck | B | Example |
| 10 | CFRP 4 (20 mm × 80 mm) | Adhesion, partially stuck | B | Example |
| 11 | CFRP 1 (20 mm × 80 mm) | Adhesion, partially stuck | B | Comparative example |
| 12 | CFRP 1 (20 mm × 80 mm) | Adhesion, partially stuck | B | Example |
| 13 | CFRP 1 (20 mm × 80 mm) | Adhesion, partially stuck | B | Example |
| 14 | CFRP 1 (20 mm × 80 mm) | Adhesion, partially stuck | B | Example |
| 15 | CFRP 1 (20 mm × 80 mm) | Adhesion, partially stuck | B | Comparative example |
| 16 | CFRP 5 (20 mm × 80 mm) | Adhesion, partially stuck | B | Example |
| 17 | CFRP 4 (20 mm × 80 mm) | Adhesion, partially stuck | B | Comparative example |
| 18 | CFRP 2 (20 mm × 80 mm) | Adhesion, partially stuck | B | Example |
| 19 | CFRP 3 (20 mm × 80 mm) | Adhesion, partially stuck | B | Example |
| 20 | CFRP 7 (20 mm × 80 mm) | Adhesion, partially stuck | B | Example |
| 21 | CFRP 7 (20 mm × 80 mm) | Adhesion, partially stuck | B | Example |
| 22 | CFRP 7 (20 mm × 80 mm) | Adhesion, partially stuck | B | Example |
| 23 | CFRP 7 (20 mm × 80 mm) | Adhesion, partially stuck | B | Example |
| 24 | CFRP 7 (20 mm × 80 mm) | Adhesion, partially stuck | B | Example |
| 25 | CFRP 1 (20 mm × 80 mm) | Thermal fusion, partially stuck | C | Example |
| 26 | CFRP 1 (20 mm × 80 mm) | Thermal fusion, partially stuck | C | Example |
| 27 | CFRP 1 (20 mm × 80 mm) | Thermal fusion, partially stuck | C | Example |
| 28 | CFRP 1 (20 mm × 80 mm) | Thermal fusion, partially stuck | C | Example |
| 29 | CFRP 1 (20 mm × 80 mm) | Thermal fusion, partially stuck | C | Example |
| 30 | CFRP 1 (20 mm × 80 mm) | Thermal fusion, partially stuck | C | Comparative example |
| 31 | CFRP 2 (20 mm × 80 mm) | Thermal fusion, partially stuck | C | Comparative example |
| 32 | CFRP 3 (20 mm × 80 mm) | Thermal fusion, partially stuck | C | Comparative example |
| 33 | CFRP 7 (20 mm × 80 mm) | Adhesion, partially stuck | D | Comparative example |
| 34 | CFRP 7 (20 mm × 80 mm) | Adhesion, partially stuck | D | Example |
| 35 | CFRP 7 (20 mm × 80 mm) | Adhesion, partially stuck | D | Example |
| 36 | CFRP 7 (20 mm × 80 mm) | Adhesion, partially stuck | D | Example |
| 37 | CFRP 7 (20 mm × 80 mm) | Adhesion, partially stuck | D | Example |
| 38 | CFRP 7 (20 mm × 80 mm) | Adhesion, partially stuck | D | Example |

TABLE 2-continued

| | CFRP | | Configuration of | |
|---|---|---|---|---|
| No. | Type | Sticking method | composite material | Note |
| 39 | CFRP 7 (20 mm × 80 mm) | Adhesion, partially stuck | D | Comparative example |
| 40 | CFRP 7 (20 mm × 80 mm) | Adhesion, partially stuck | D | Example |
| 41 | CFRP 7 (20 mm × 80 mm) | Adhesion, partially stuck | D | Example |
| 42 | CFRP 6 (20 mm × 80 mm) | Adhesion, partially stuck | D | Example |
| 43 | CFRP 7 (20 mm × 80 mm) | Adhesion, partially stuck | E | Example |

EVALUATION

1. Production and Evaluation of Alternating Impedance Measurement Sample

An alternating impedance measurement sample under an electrolytic solution environment was produced as described below. The electrodeposition film and the plate on the side of the metal-carbon fiber reinforced resin material composite sample to which the CFRP was not stuck were removed, the material of the steel sheet (metal member) was exposed, and the electrodeposition film on the CFRP on the side to which the CFRP was stuck was detached using a surface and interfacial cutting analysis system "SAICAS (registered trademark) EN" manufactured by Daipla Wintes Co., Ltd. Next, blanking was carried out with a press-type blanking machine in which a punching die having a diameter ($\phi$) of 15 mm was used, and burrs were removed from the blanked sample with a file. At the time of detaching the electroplating covering on the CFRP, the surface of the CFRP layer was scraped off as deep as 100 μm or less toward the CFRP layer from the interface between the CFRP layer and the electrodeposition film, and, as a detachment area, a $\phi$15 mm range, in which the alternating impedance was to be measured, was detached by scraping.

The alternating impedance was measured as described below. In the alternating impedance sample produced above, a lead wire was attached to the steel sheet-exposed portion side of the sample such that the side to which the CFRP was stuck became a solution contact surface as a working electrode. At that time, the measurement surface (the contact surface with an electrolytic solution) was adjusted to 1.0 cm$^2$ with a silicon rubber packing. Additionally, a carbon electrode was used as a counter electrode, and a silver-silver chloride electrode was used as a reference electrode. As the electrolytic solution, a 5% NaCl solution (100 ml, 25° C.) having a saturated dissolved oxygen level was used. The sample was left to stand in the electrolytic solution for 60 minutes, then, a 5 mV alternating voltage was injected thereinto using a potentiostat, and the impedance was measured at the time of changing the frequency from 10 mHz to 1 kHz.

Alternating impedances at a frequency of 1 Hz of the metal-carbon fiber reinforced resin material composite samples were evaluated as A at $5\times10^8 \Omega$ or more, as B at $1\times10^8 \Omega$ or more and less than $5\times10^8 \Omega$, as C at $1\times10^7 \Omega$ or more and less than $1\times10^8 \Omega$, as D at $5\times10^6 \Omega$ or more and less than $1\times10^7 \Omega$, as E at $1\times10^6 \Omega$ or more and less than $5\times10^6 \Omega$, as F at less than $1\times10^6 \Omega$, and as × at more than $1\times10^9 \Omega$, and the alternating impedances at a frequency of 1 Hz at the time of immersing the metal-carbon fiber reinforced resin material composite sample in the 5 mass % sodium chloride aqueous solution of $1\times10^7 \Omega$ to $1\times10^9 \Omega$, which were evaluated as A, B, and C, were regarded as pass.

2. Blanking Workability

Whether the CFRP layer was detached from the metal member in the blank end portion of the blanked metal-carbon fiber reinforced resin material composite sample was inspected. A case where the CFRP layer was not detached was evaluated as A, a case where the CFRP layer was partially detached was evaluated as B, a case where the CFRP layer was fully detached was evaluated as C, and the case of A, in which the CFRP layer was not detached, was regarded as pass.

3. Measurement of Film Thicknesses of Electrodeposition Film

The obtained metal-carbon fiber reinforced resin material composite sample was cut out, implanted into a resin, polished, and deposited, thereby producing an implanted sample enabling the cross-sectional observation of the composite. The average film thicknesses A, B, and C of the electrodeposition film in the produced sample were measured with a scanning electron microscope at a magnification of 2000 times. For each of the average film thicknesses, 10 visual fields were observed in each portion with the scanning electron microscope, the film thickness of the electrodeposition film at an arbitrary place in each measurement visual field was measured, and the average value of the 10 visual fields was regarded as each average film thickness of the electrodeposition film. Regions in which the film thickness significantly changed such as a region near the end portion of the CFRP layer and a region near the end portion of the coating layer were excluded from the film thickness measurement object portions. Specifically, in the case of measuring the average film thickness C, the film thickness of the electrodeposition film present in a region from a place apart from the end portion of the CFRP layer by a distance of the average film thickness A to the end portion of the coating layer was measured. In the case of measuring the average film thickness B, the film thickness of the electrodeposition film present in a region from a place apart from the end portion of the coating layer by a distance of the average film thickness C to the end portion of the metal member was measured. Regarding each average film thickness of the electrodeposition film shown in Table 2, each metal-carbon fiber reinforced resin material composite sample was regarded as the metal-carbon fiber reinforced resin material composite 11B of FIG. 4, the average film thickness of the electrodeposition film formed on the CFRP layer was expressed as the average film thickness A, the average film thickness of the electrodeposition film formed on the first region was expressed as the average film thickness B, and the average film thickness of the electrodeposition film formed on the second region was expressed as the average film thickness C.

4. Corrosion Resistance

A cycle corrosion test (CCT) was carried out using the metal-carbon fiber reinforced resin material composite samples obtained before and after the electrodeposition coating. The mode of the CCT was in accordance with Japanese Automobile Standards Organization JASO-M609. The evaluation surface was the CFRP side of the sample, and the test was carried out with the sample installed in a tester such that saline water was sprayed to the evaluation surface.

The test was carried out 240 cycles (one cycle every eight hours), the sample appearance after the test was visually observed, and the length of red rust generated from the end portion to which the CFRP was stuck was measured. In a case where the metal sheet was an AL sheet, no red rust was generated, but the length of a place in which the film near the end portion to which the CFRP was stuck swelled was regarded as the length of red rust generated and measured.

Since the CFRP was 20 mm in width and 80 mm in length, the maximum length of red rust was 200 mm.

The lengths of red rust generated were evaluated as A at 0 mm, as B at longer than 0 mm and 5 mm or shorter, as C at longer than 5 mm and 10 mm or shorter, as D at longer than 10 mm and 20 mm or shorter, as E at longer than 20 mm and 100 mm or shorter, and as F at longer than 100 mm, and the lengths of red rust generated of 10 mm or shorter, which were evaluated as A, B, and C, were regarded as pass.

The above-described results are shown in Table 3. "–" in Table 3 indicates that there is no electrodeposition film for the corresponding item.

TABLE 3

| | | | Evaluation result | | | | | |
|---|---|---|---|---|---|---|---|---|
| | | | Corrosion | Corrosion | Electrodeposition film thickness | | | |
| No. | Alternating impedance | Blanking workability | resistance before electrode position painting | resistance after electrodeposition painting | Film thickness A (μm) | Film thickness B (μm) | Film thickness C (μm) | Note |
| 1 | B | A | F | A | 0.4 | — | — | Example |
| 2 | C | A | D | B | 0.9 | — | — | Example |
| 3 | C | A | D | B | 0.9 | — | — | Example |
| 4 | E | A | F | E | 3.0 | 15.0 | — | Comparative example |
| 5 | D | A | F | D | 2.0 | 17.0 | — | Comparative example |
| 6 | C | A | F | C | 1.0 | 15.5 | — | Example |
| 7 | C | A | F | C | 0.9 | 16.5 | — | Example |
| 8 | D | A | F | D | 2.0 | 17.0 | — | Comparative example |
| 9 | C | A | F | C | 1.2 | 16.0 | — | Example |
| 10 | C | A | F | C | 1.0 | 16.5 | — | Example |
| 11 | D | A | F | D | 1.8 | 17.0 | — | Comparative example |
| 12 | C | A | F | C | 1.4 | 15.0 | — | Example |
| 13 | C | A | F | C | 1.1 | 15.0 | — | Example |
| 14 | B | A | F | A | 0.4 | 16.5 | — | Example |
| 15 | X | A | F | D | 0.0 | 17.0 | — | Comparative example |
| 16 | C | A | F | C | 1.4 | 15.0 | — | Example |
| 17 | D | A | F | D | 2.0 | 17.0 | — | Comparative example |
| 18 | C | A | F | C | 1.0 | 15.5 | — | Example |
| 19 | B | A | F | B | 0.4 | 17.0 | — | Example |
| 20 | C | A | F | C | 1.0 | 15.0 | — | Example |
| 21 | C | A | F | C | 1.0 | 16.0 | — | Example |
| 22 | C | A | F | C | 1.0 | 16.5 | — | Example |
| 23 | C | A | F | C | 1.0 | 17.0 | — | Example |
| 24 | C | A | F | C | 1.0 | 16.0 | — | Example |
| 25 | C | A | F | C | 0.8 | 17.0 | 1.1 | Example |
| 26 | C | A | F | C | 0.9 | 17.0 | 1.2 | Example |
| 27 | C | A | F | C | 0.7 | 17.0 | 1.0 | Example |
| 28 | C | A | F | C | 0.7 | 17.0 | 0.9 | Example |
| 29 | C | A | F | C | 0.9 | 17.0 | 1.1 | Example |
| 30 | E | A | F | E | 2.3 | 17.0 | 7.4 | Comparative example |
| 31 | E | A | F | E | 3.1 | 17.0 | 5.8 | Comparative example |
| 32 | D | A | F | D | 2.9 | 17.0 | 6.4 | Comparative example |
| 33 | D | A | F | D | 2.0 | 17.0 | 3.0 | Comparative example |
| 34 | C | A | F | C | 1.0 | 17.0 | 2.0 | Example |
| 35 | C | A | F | C | 1.0 | 17.0 | 2.0 | Example |
| 36 | C | A | F | C | 1.0 | 17.0 | 1.5 | Example |
| 37 | C | A | F | C | 1.0 | 17.0 | 1.5 | Example |
| 38 | B | A | F | C | 0.8 | 17.0 | 1.0 | Example |
| 39 | D | A | F | D | 1.8 | 17.0 | 5.0 | Comparative example |
| 40 | C | A | F | C | 1.0 | 17.0 | 1.5 | Example |
| 41 | C | A | F | C | 1.0 | 17.0 | 1.5 | Example |
| 42 | B | A | F | B | 0.3 | 17.0 | 1.5 | Example |
| 43 | C | A | F | B | 0.8 | 17.0 | 1.2 | Example |

The above-described results show that the metal-carbon fiber reinforced resin material composite samples according to the example in which the alternating impedance was $1\times10^7\Omega$ to $1\times10^9\Omega$ were excellent in terms of corrosion resistance. In contrast, the metal-carbon fiber reinforced resin material composite samples according to comparative examples were poor in terms of corrosion resistance.

The metal-carbon fiber reinforced resin material composite samples of Comparative Examples 4, 5, 8, 11, 17, 30 to 33, and 39 had an alternating impedance of less than $1\times10^7\Omega$ and an electrodeposition film that was thicker than 1.4 μm and were thus poor in terms of corrosion resistance. The metal-carbon fiber reinforced resin material composite sample of Comparative Example 15 had an alternating impedance of more than $1\times10^9\Omega$ and an electrodeposition film that was thinner than 0.3 μm and were thus poor in terms of corrosion resistance.

Hitherto, the preferable embodiment of the present invention has been described in detail with reference to the accompanying drawings, but the present invention is not limited to such examples. It is evident that a person skilled in the art of the present invention is able to consider a variety of modification examples or correction examples within the scope of the technical concept described in the claims, and it is needless to say that such examples are understood to be in the technical scope of the present invention.

BRIEF DESCRIPTION OF THE REFERENCE SYMBOLS 1, 1A, 1B, 1C, 1D, 1E Metal member
2, 2A, 2B, 2C, 2D, 2E Coating layer
3, 3A, 3B, 3C, 3D, 3E Carbon fiber reinforced resin material layer
4, 4A, 4B, 4C, 4D, 4E Electrodeposition film
7, 7A, 7B, 7C, 7D First region
8, 8A, 8B, 8C, 8D Second region
9A, 9B, 9C, 9D, 9E, 9F, 9G Resin layer
11, 11A, 11B, 11C, 11D, 11E Metal-carbon fiber reinforced resin material composite
21 Carbon fiber material
22 Matrix resin
31 Silicon packing
32 Counter electrode
33 Working electrode
34 Reference electrode
35 Potentiostat

What is claimed is:

1. A metal-carbon fiber reinforced resin material composite comprising:
    a metal member;
    a coating layer that is disposed on at least a part of a surface of the metal member and contains a resin;
    a carbon fiber reinforced resin material layer that is disposed on at least a part of a surface of the coating layer and contains a matrix resin and a carbon fiber material that is present in the matrix resin; and
    an electrodeposition film disposed so as to cover at least all of surfaces of the carbon fiber reinforced resin material layer, an interface between the metal member and the coating layer, and an interface between the coating layer and the carbon fiber reinforced resin material layer,
    wherein an average film thickness A of the electrodeposition film formed on the surface of the carbon fiber reinforced resin material layer is 0.3 to 1.4 μm, and
    after removing the electrodeposition film, immersing the metal-carbon fiber reinforced resin material composite in an aqueous solution containing 5 mass % of sodium chloride, an alternating impedance at a frequency of 1 Hz is $1\times10^7\Omega$ to $1\times10^9\Omega$.

2. The metal-carbon fiber reinforced resin material composite according to claim 1,
    wherein, in a first region of the surface of the metal member in which the coating layer is not disposed, the average film thickness A and an average film thickness B of the electrodeposition film formed on the first region satisfy the following formula (1), $$B > 10 \times A. \tag{1}$$

3. The metal-carbon fiber reinforced resin material composite according to claim 1,
    wherein, in a second region of the surface of the coating layer in which the carbon fiber reinforced resin material layer is not disposed, the average film thickness A and an average film thickness C of the electrodeposition film formed on the second region satisfy the following formula (2), $$5 \text{ μm} > C > A. \tag{2}$$

4. The metal-carbon fiber reinforced resin material composite according to claim 1,
    wherein the coating layer includes a plurality of resin layers.

5. The metal-carbon fiber reinforced resin material composite according to claim 1,
    wherein the matrix resin contains 50 mass % or more of a phenoxy resin.

6. The metal-carbon fiber reinforced resin material composite according to claim 1,
    wherein the coating layer contains an epoxy resin.

* * * * *